United States Patent
Kawamura

(10) Patent No.: US 10,064,423 B2
(45) Date of Patent: Sep. 4, 2018

(54) PRESERVATION TREATMENT APPARATUS FOR MATERIAL CONTAINING OXIDE

(71) Applicant: ATOM CO., LTD., Kochi-shi, Kochi (JP)

(72) Inventor: Munetoshi Kawamura, Kochi (JP)

(73) Assignee: ATOM CO., LTD., Kochi (JP)

(*) Notice: Subject to any disclaimer, the term of this patent is extended or adjusted under 35 U.S.C. 154(b) by 549 days.

(21) Appl. No.: 14/443,258

(22) PCT Filed: Nov. 17, 2013

(86) PCT No.: PCT/JP2013/080961
§ 371 (c)(1),
(2) Date: Aug. 26, 2015

(87) PCT Pub. No.: WO2014/077377
PCT Pub. Date: May 22, 2014

(65) Prior Publication Data
US 2015/0351446 A1    Dec. 10, 2015

(30) Foreign Application Priority Data
Nov. 16, 2012 (JP) ................................ 2012-251717

(51) Int. Cl.
*A23L 3/32* (2006.01)
(52) U.S. Cl.
CPC ................ *A23L 3/325* (2013.01); *A23L 3/32* (2013.01); *A23V 2002/00* (2013.01)
(58) Field of Classification Search
None
See application file for complete search history.

(56) References Cited

U.S. PATENT DOCUMENTS 3,966,581 A * 6/1976 Holte .................... C25D 5/02
                                                    204/198
4,378,284 A * 3/1983 Iwasaki ............ C25D 7/0614
                                                    204/206
(Continued)

FOREIGN PATENT DOCUMENTS

JP        62-297677 A       12/1987
JP        2010-263884 A     11/2010
(Continued)

OTHER PUBLICATIONS

International Search Report for the Application No. PCT/JP2013/080961 dated Feb. 18, 2014.

*Primary Examiner* — Stefanie S Wittenberg
(74) *Attorney, Agent, or Firm* — Cheng Law Group, PLLC

(57) ABSTRACT

An object of the present invention is to provide a preservation treatment apparatus which can sufficiently apply an effect generated by charges to an object to be preserved thus more surely exhibiting a preservation effect generated by charges, and can stably hold an effect of a potential applied to the object to be preserved by controlling the flow of an electric current in a stacked portion of the object. A preservation treatment apparatus includes: a conductive enclosure structure arranged at least either one of both sides or an upper side of the placing portion 1, and surrounding at least either one of both sides or the upper side of the object O as viewed from the object O placed on the placing surface; a first electrode 21 brought into contact with an upper position of the placing portion 1 close to one side portion 11S of the placing portion 1; a second electrode 22 brought into contact with a lower position of the placing portion 1 close to the other side portion 12S of the placing portion 1; a third electrode 23 brought into contact with a position of the enclosure structure close to one side portion of the enclosure (Continued)

structure; a fourth electrode 24 brought into contact with a position of the enclosure structure close to the other side portion of the enclosure structure; and a voltage supply portion 20 which is electrically connected with these electrodes respectively. The voltage supply portion 20 simultaneously applies a negative DC voltage to either one of the first electrode 21 and the second electrode 22 and applies an AC voltage to the other one of the first electrode 21 and the second electrode 22.

4 Claims, 13 Drawing Sheets

(56) References Cited

U.S. PATENT DOCUMENTS

| | | | | |
|---|---|---|---|---|
| 4,612,199 | A * | 9/1986 | Miyahara | A23L 3/005 |
| | | | | 219/771 |
| 4,680,100 | A * | 7/1987 | Morin | C25B 11/02 |
| | | | | 204/242 |
| 6,138,555 | A * | 10/2000 | Hata | A23L 3/005 |
| | | | | 363/52 |
| 6,323,473 | B1 * | 11/2001 | Yamamoto | A23L 3/01 |
| | | | | 219/771 |
| 2008/0038151 | A1 * | 2/2008 | Kim | A23L 3/32 |
| | | | | 422/22 |
| 2013/0118126 | A1 * | 5/2013 | Hulliger | C25D 11/005 |
| | | | | 53/431 |

FOREIGN PATENT DOCUMENTS

| | | |
|---|---|---|
| WO | WO-98/041115 A1 | 9/1998 |
| WO | WO-2005/013730 A1 | 2/2005 |

* cited by examiner

PRESERVATION TREATMENT APPARATUS FOR MATERIAL CONTAINING OXIDE

TECHNICAL FIELD

The present invention relates to a preservation treatment apparatus which can hold materials containing oxide (biomaterials including animals and plants, fresh foods and processed foods, and liquids including beverages and seasoning liquids) in a state where the materials can be preserved (a constant-temperature state, a freezing state or a refrigerating state) for a long time or for a long period.

BACKGROUND ART

With respect to a food preservation apparatus provided with high-voltage electric field forming electrodes, conventionally, there has been disclosed a food preservation apparatus which includes a current limiting mechanism in a high voltage power source, a DC current is used as a DC power source, and an AC current is superimposed on the DC current (patent document 1). This apparatus aims at a preservation effect generated by electric field treatment. It is considered that by providing the apparatus where a food support shelf in a freezer or a refrigerator is used as a high-voltage electric field forming electrode, and a high voltage electric field is applied to foods during preservation, foods and the like can be preserved for a long period or an action of improving tastes of foods and the like is generated.

Conventionally, as inventions relating to a positive electric field treatment method, a positive electric field treatment apparatus and electrodes used in these method and apparatus, there has been disclosed the invention where foods and the like are placed on a shelf in a preservation storage, and electricity is applied to a charge plate (patent document 2).

PRIOR ART DOCUMENTS

Patent Documents

Patent Document 1: Japanese Patent Laid-open Publication No. 62-297677
Patent Document 2: PCT International Publication WO98/41115A1

SUMMARY OF THE INVENTION

Problems to be Solved by the Invention

However, in the above-mentioned conventional preservation apparatus, a preservation effect is given only by an electromagnetic field generated using the shelf on which foods are placed as a terminal. Accordingly, an effect generated by charges is not sufficient and hence, there may be a case where a preservation effect is poor.

Further, in the conventional preservation apparatus, only a terminal at one pole is connected to the shelf and charges are applied only from the terminal and hence, the flow of an electric current on the shelf cannot be controlled thus giving rise to a drawback that the holding of a potential of a shelf portion becomes unstable.

Accordingly, it is an object of the present invention to provide a preservation treatment apparatus which can sufficiently apply an effect generated by charges to an object to be preserved thus more surely exhibiting a preservation effect generated by charges, and can stably hold an effect generated by as potential applied to the object to be preserved by controlling the flow of an electric current in a portion on which the object is stacked.

Solutions to the Problems

The present invention provides the following means to overcome the above-mentioned drawbacks.

(1) A preservation treatment apparatus according to the present invention is a preservation treatment apparatus for treating an object O containing oxide into a preservable state which includes:

a placing portion having a conductive placing surface on which the object is placed or an engaging portion having a conductive engaging surface with which the object is engaged;

a conductive enclosure structure configured to be formed continuously with an upper portion of the placing portion or configured to be arranged in the vicinity of the placing portion in a spaced-apart manner, and surrounding at least any one of both sides, front and rear sides and upper and lower sides of the object as viewed from the object placed on the placing surface;

one or more sets of electrodes, each set of electrodes being constituted of a DC electrode which is brought into contact with either one of the placing portion and the enclosure structure and an AC electrode which is brought into contact with the other one of the placing portion and the enclosure structure respectively;

a voltage supply portion electrically connected with respective electrodes which constitutes the set of electrodes, the voltage supply portion being configured to supply a negative DC voltage to one electrode of each set of electrodes and to supply an AC voltage to the other electrode, wherein one electrode and the other electrode which constitute the set of electrodes are respectively arranged at symmetrical positions in to spaced-apart manner along extensions of a diagonal line direction on one plane expanding outwardly as viewed from the object placed on the placing portion or engaged with the engaging portion, in a state where at least any one of both sides, front and rear sides and upper side of the object as viewed from the object are surrounded by the conductor, the voltage supply portion simultaneously applies a negative DC voltage and an AC voltage to one and the other of the electrodes which are arranged in a spaced-apart manner along both directions along a diagonal line direction where the object is arranged close to the center on one plane expanding outwardly of either one of the placing portion and the enclosure structure which surround the periphery of the object respectively.

To be more specific, as in the case of the embodiment 1 described later, the preservation treatment apparatus may include:

a placing portion 1 having a conductive lining surface on which the object O is placed;

a conductive enclosure structure arranged at least on either one of both sides or an upper side of the placing portion 1, and surrounding at least either one of both sides or the upper side of the object O as viewed from the object O placed on the placing surface;

a first electrode 21 brought into contact with an upper position of the placing portion 1 close to one side portion 11S of the placing portion 1 as viewed from the object O placed on the placing portion 1;

a second electrode 22 brought into contact with a lower position of the placing portion 1 close to the other side portion 12S of the placing portion 1 as viewed from the object O placed on the placing portion 1;

a third electrode 23 brought into contact with a position of the enclosure structure close to one side portion of the enclosure structure as viewed from the object O placed on the placing portion 1;

a fourth electrode 24 brought into contact with a position of the enclosure structure close to the other side portion of the enclosure structure as viewed from the object O placed on the placing portion 1; and a voltage supply portion 20 which is electrically connected with the first electrode 21, the second electrode 22, the third electrode 23 and the fourth electrode 24 respectively, wherein the voltage supply portion 20 simultaneously applies a negative DC voltage to either one of the first electrode 21 and the second electrode 22 and an AC voltage to the other one of the first electrode 21 and the second electrode 22, and the voltage supply portion 20 simultaneously applies a negative DC voltage to either one of the third electrode 23 and the fourth electrode 24 and an AC voltage to the other one of the third electrode 23 and the fourth electrode 24.

(2) In the above-mentioned preservation treatment apparatus, it is preferable that the voltage supply portion 20 simultaneously apply a negative DC voltage equal to the voltage applied to the first electrode 21 to either one of the third electrode 23 and the fourth electrode 24 and an AC voltage equal to the voltage applied to the second electrode 22 to the other one of the third electrode 23 and the fourth electrode 24.

(3) Further, in either one of the above-mentioned preservation treatment apparatuses, it is preferable that the enclosure structure include a lid plate 5 arranged above at least a placing plate and expanding in the planar direction, and an upper position of the lid plate 5 close to one side portion of the lid plate 5 be brought into contact with the third electrode and a lower position of the lid plate 5 close to the other side portion of the lid plate 5 be brought into contact with the fourth electrode respectively, and the lid plate 5 to which electricity is applied by the voltage supply portion form an electric energy field above the object O placed on the placing surface.

(4) In any one of the above-mentioned preservation treatment apparatuses, it is preferable that conductive fibers S be disposed in a fixed manner above the placing surface of the placing portion, on an upper portion of the enclosure structure or on both side portions and front and rear portions of the enclosure structure so as to surround at least one of upper and lower sides or four peripheral sides of the object placed on the placing portion, and a negative DC voltage and an AC voltage be simultaneously applied to the conductive fibers by the voltage supply portion in a state where the conductive fibers surround the object on the placing portion.

Further, when used as freezing, refrigerating or constant-temperature preservation treatment apparatus, it is preferable that the preservation treatment apparatus include: a chamber 4 formed so as to surround the placing portion 1 and both sides or an upper portion of the enclosure structure 3/5, and a temperature adjuster IF for cooling the inside of the chamber 4, wherein a negative DC voltage and an AC voltage are applied by the voltage supply portion 20, and a temperature of the object O placed on the placing portion 1 be adjusted by the temperature adjuster F.

(5) In any one of the above-mentioned preservation treatment apparatuses, it is preferable that the placing portion 1 be formed of a belt structure which includes: a belt body constituted of a large number of belt pieces 1B connected together in a belt shape; and a plurality of belt rolls R for controlling belt rotation by being brought into contact with respective inner surfaces of a front side and a rear side of the belt body in an advancing direction of the belt body, the first electrode 21 and the second electrode 22 are arranged as a pair on left and right sides respectively at a plurality of arrangement portions of the belt structure along the belt advancing direction such that the first electrode 21 is brought into contact with one of an upper surface of one edge and a lower surface of one edge of the belt pieces 1B on an upper side of the belt body and the second electrode 22 is brought into contact with the other of the upper surface of one edge and the lower surface of one edge of the belt pieces 1B on the upper side of the belt body, the enclosure structure include: a frame structure 3 formed of assembled frame members surrounding side peripheries or upper and lower peripheries of the belt structure; and a lid plate 5 openably mounted on an upper assembled frame member 33 of the frame structure 3, the third electrode 23 and the fourth electrode 24 are arranged as a pair on left and right sides respectively at a plurality of arrangement portions along the belt advancing direction such that the third electrode 23 is brought into contact with one of an upper surface of one edge and a lower surface of one edge of the lid plate 5 and the fourth electrode 24 is brought into contact with the other of the upper surface of one edge and the lower surface of one edge of the lid plate 5, the chamber 4 is formed of a tunnel like space having an inlet and an exit on both front and rear ends thereof respectively and surrounding the belt structure, the frame structure 3 and the lid plate 5, and the temperature adjuster F be configured to cool the object O on the belt structure during conveyance using the belt structure.

Effects of the Invention

With the provision of the above-mentioned means, by bringing the electrode terminals into contact with both side portions of the placing plate and by bringing the electrode terminals also into contact with the enclosure structure which surrounds both sides or the upper side of the placing plate, a composite electric energy field can be supplied to an object from two or more directions including the direction from the placing plate and the direction from the enclosure structure. Accordingly, an effect generated by charges to the object becomes sufficient and hence, the preservation treatment apparatus can more surely exhibit a preservation effect generated by charges. Further, two electrode terminals of a negative DC voltage and an AC voltage are brought into contact with one and the other of left and right side portions respectively in the placing plate and the enclosure structure respectively, and the voltages are simultaneously applied to the respective terminals and hence, the flow of an electric current is controlled to a flow from one terminal side to the other terminal side. Accordingly, the flow of an electric current at a portion where the object is stacked can be controlled and hence, an effect generated by a potential which is applied to the object can be held stably.

DESCRIPTION OF REFERENCE SIGNS

Figure 1:
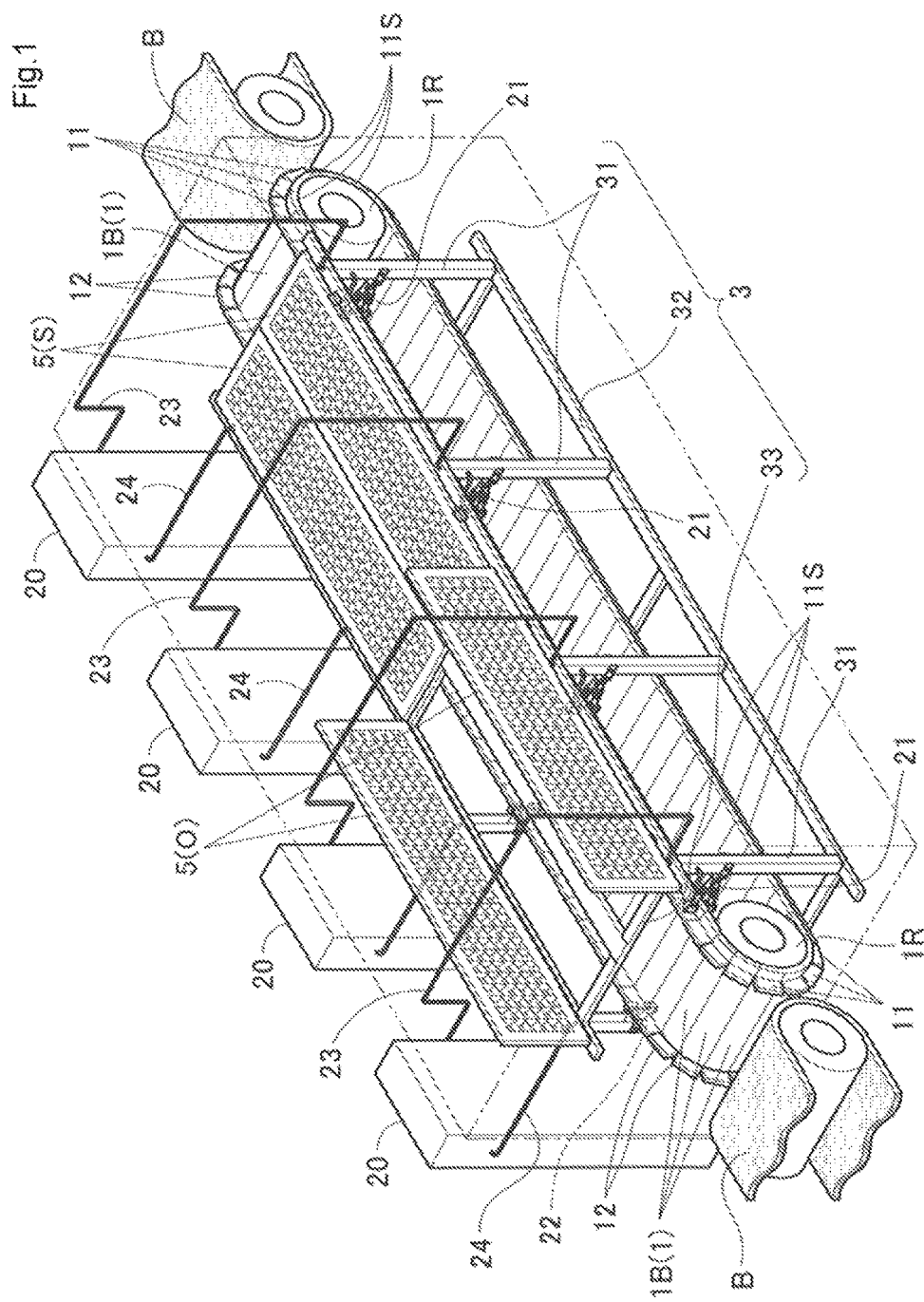
FIG. 1 is a perspective appearance view showing the internal constitution of a preservation treatment apparatus according to an embodiment 1 in a state where a lid plate is partially opened.
Figure 2:
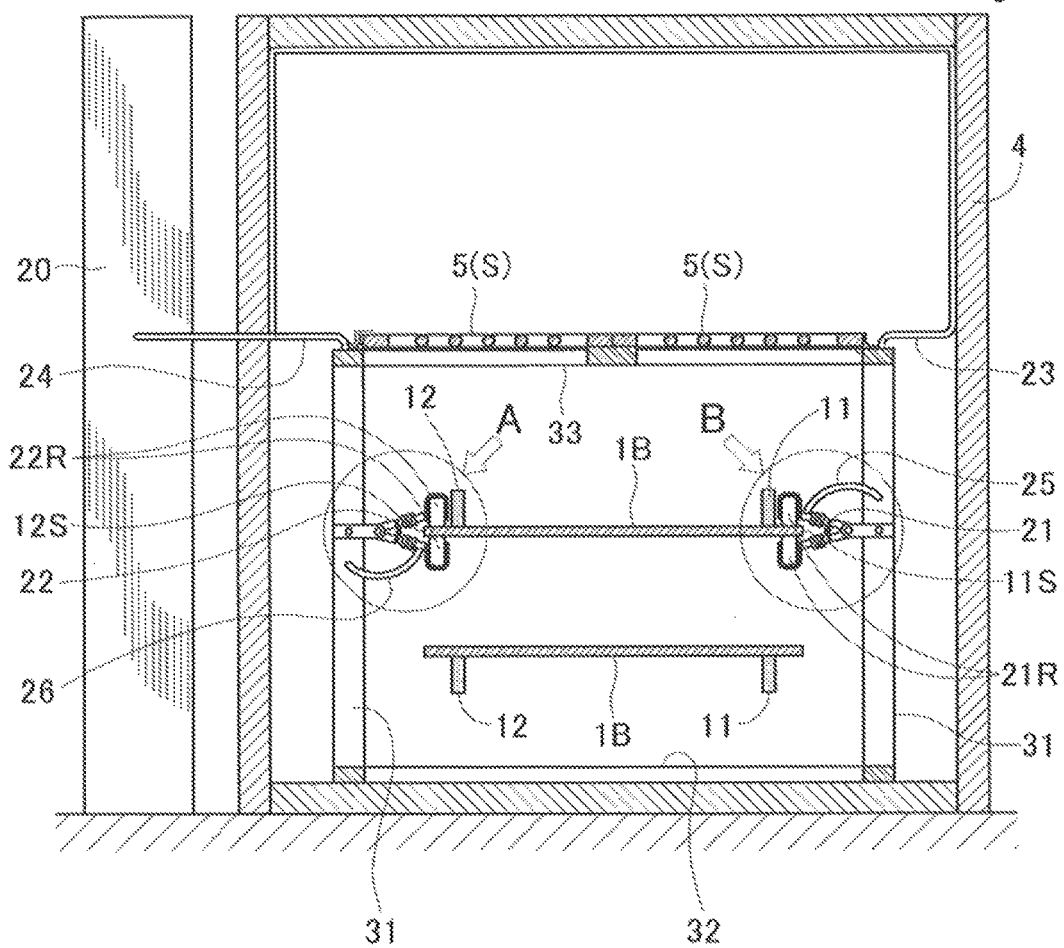
FIG. 2 is an explanatory view showing a cross section as viewed in a front elevation view of an essential part of the preservation treatment apparatus according to the embodiment 1 in a state where the lid plate is closed.
Figure 3:
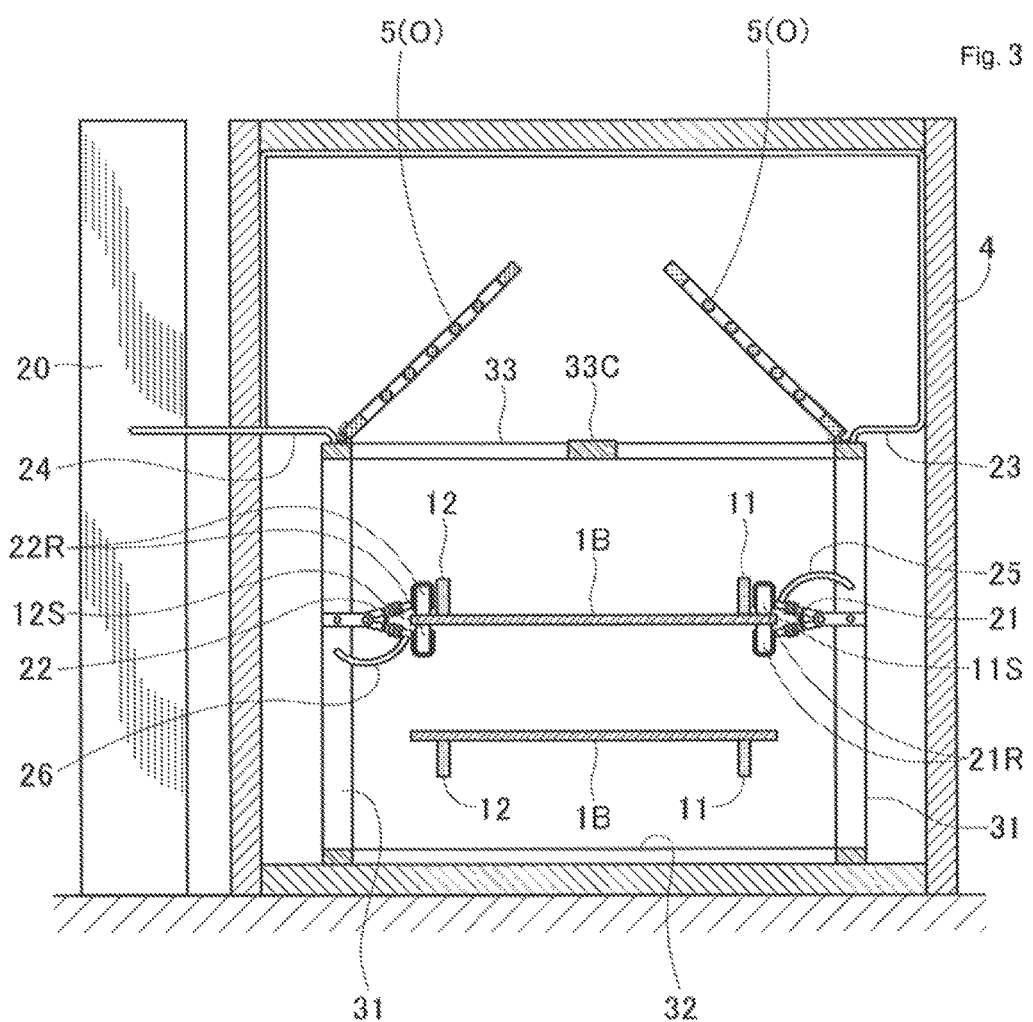
FIG. 3 is an explanatory view showing a cross section as viewed in a front elevation view of an essential part of the preservation treatment apparatus according to the embodiment 1 in a state where the lid plate is in the middle of an opening/closing operation.
Figure 4:
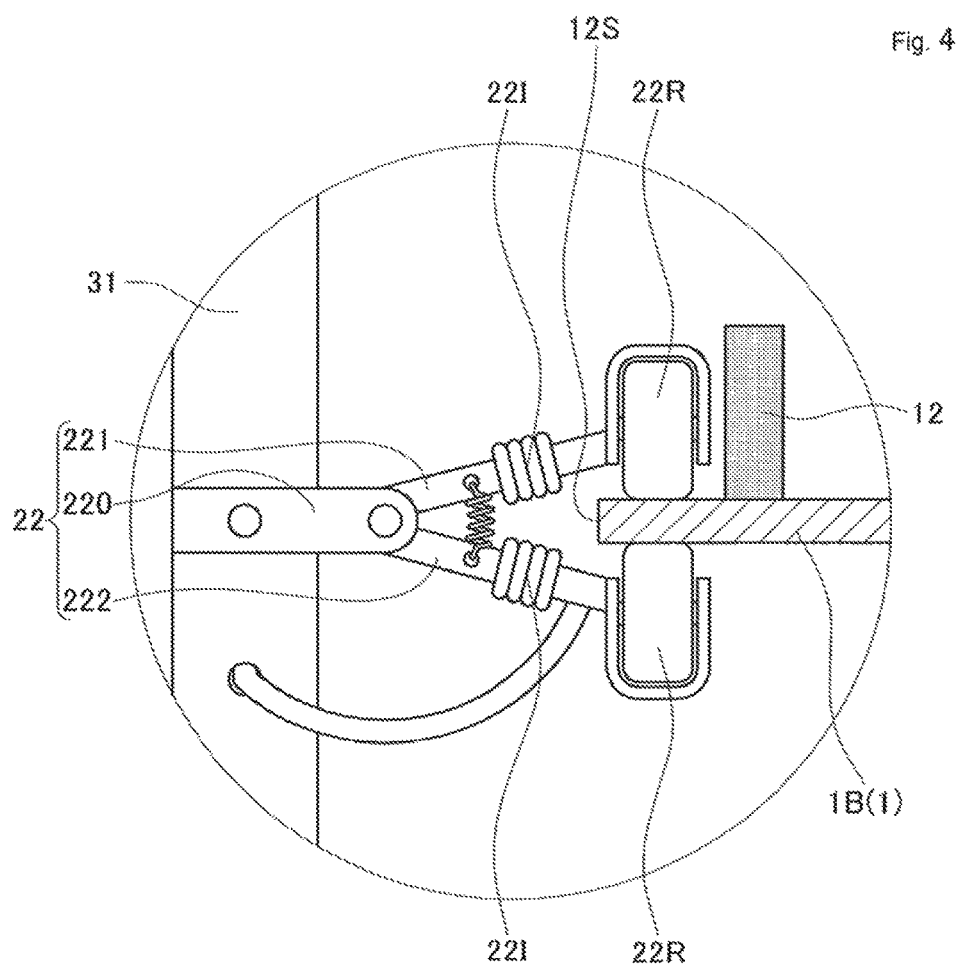
FIG. 4 is a partially enlarged view as viewed in a front elevation view of a portion A (structure of a second electrode and parts in an area around the second electrode) in FIG. 2.

Hereinafter, the present invention is described by reference to respective drawings which show embodiments of the present invention. In all embodiments, a preservation treatment apparatus according to the present invention is an apparatus where a biomaterial, a food (including particularly meat products of living body such as fish, meat, and shells and fresh products of plants such as fruits and vegetables) and a liquid in which oxidation progresses with time such as aging, weathering or putrefaction because of containing oxide is used as an object O, and the object is subjected to preservation treatment in a preservable state such as a freezing state, a refrigerating state, a half refrigerating state or a constant temperature state. The preservation treatment apparatus includes at least the following basic constitution as the technical features of the present invention.
(Basic Constitution)

The preservation treatment apparatus for treating an object O containing oxide into a preservable state includes:

a placing portion 1 or a fixing portion 7F having a conductive contact surface on which the object is placed or to which the object is fixed;

a conductive enclosure structure (a frame structure 3 or/and a lid plate 5) configured to be formed continuously with an upper portion of the placing portion 1 or configured to be arranged in the vicinity of the placing portion 1 in a spaced-apart manner, and surrounding at least any one of both sides, front and rear sides and upper and lower sides of the object O as viewed from the object O placed on the placing surface;

one or more sets of electrodes, each set of electrodes being constituted of: a DC electrode which is brought into contact with either one of the placing portion 1 and the enclosure structure; and an AC electrode which is brought into contact with the other one of the placing portion 1 and the enclosure structure respectively; and a voltage supply portion 20 electrically connected with respective electrodes which constitute the set of electrodes, and is configured to supply a negative DC voltage to one electrode of each electrode set and supply an AC voltage to the other electrode.

In the above-mentioned configuration, one electrode and the other electrode which constitute the set of electrodes are respectively arranged at symmetrical positions in a spaced-apart manner along a diagonal line direction on one plane expanding outwardly as viewed from the object O placed on the placing portion 1.

In a state where, in addition to a lower portion of the object O, at least any one of both sides, front and rear sides and upper side of the object O as viewed from the object O is surrounded by the conductor by the enclosure structure, the voltage supply portion 20 simultaneously applies a negative DC voltage and an AC voltage to o le and the other of the electrodes which are arranged in a spaced-apart manner along both directions along a diagonal line direction where the object O is arranged close to the center on one plane expanding outwardly of either one of the placing portion 1 and the enclosure structure which surround the periphery of the object O respectively.

The inventors of the present invention have carried out a comparison experiment with respect to a method of simultaneously applying a DC voltage and an AC voltage to an object O. As the result of the comparison experiment, the inventors of the present invention have found out that, in the case where one or the other of the electrode set is arranged in a diagonal line direction about the object O on a close contact surface (that is, on one plane expanding outwardly close to the object O) of at least one of the placing portion 1 or the enclosure structure, the preservation property of the object O is apparently increased compared to other electrode arrangements (for example, when both one electrode and the other electrode are arranged in a spacer-apart manner at the same height on one side when one electrode and the other electrode are viewed from the object).

For example, when the comparison experiment is carried out where a cut piece of tuna and white peach which are fresh food materials are used as objects and the arrangement of positions where the electrode set is fixed to the tray-like placing portion 1 is changed, an amount of change in drip quantity and color at the time of defrosting is small only when the electrode set is arranged on any one of diagonal lines consisting to a diagonal line between a right rear side and a left front side, and a diagonal line between a left rear side and a right front side. It is considered that an effect of simultaneous application is uniformly applied to the object.
(Representative Constitutional Example)

Provided that the preservation treatment apparatus has the above-mentioned basic constitution, even when various arrangements are applied to the constitution of the enclosure structure or the arrangement of electrode sets, the advantageous effects of the present invention can be acquired. For example, as representative constitutional examples, the following two representative constitutions 1, 2 are named.

(Representative Constitution 1)

A preservation treatment apparatus includes:

a placing portion 1 having a conductive placing surface on which the object O is placed;

a conductive enclosure structure (3 or/and 5) arranged at least either one of both sides or an upper side of the placing portion 1, and surrounding at least either one of both sides or the upper side of the object O as viewed from the object O placed on the placing surface;

a first electrode 21 brought into contact with a position of the placing portion 1 close to one side portion 11S of the placing portion 1 as viewed from the object O placed on the placing portion 1;

a second electrode 22 brought into contact with a position of the placing portion 1 close to the other side portion 12S of the placing portion 1 as viewed from the object O placed on the placing portion 1, the position being arranged on a side symmetrically opposite to the first electrode 21 as viewed in a plan view; and a voltage supply portion 20 which supplies a negative DC voltage to either one of the first electrode 21 and the second electrode 22, and simultaneously supplies an AC voltage to the other of the first electrode 21 and the second electrode 22.

(Representative Constitution 2)

A preservation treatment apparatus includes:

a placing portion 1 having a conductive placing surface on which the object O is placed;

a conductive enclosure structure (3 or/and 5) arranged at least either one of both sides or an upper side of the placing portion 1, and surrounding at least either one of both sides or the upper side of the object O as viewed from the object O placed on the placing surface;

a third electrode 23 brought into contact with a position of the enclosure structure 3/5 close to one side portion of the enclosure structure 3/5 as viewed from the object O placed on the placing portion 1;

a fourth electrode 24 brought into contact with a position of the enclosure structure 3/5 close to one side portion or the other side portion of the enclosure structure 3/5 as viewed from the object O placed on the placing portion 1, the position being arranged on a side symmetrically opposite to the first electrode 21 as viewed in a see-through side view; and a voltage supply portion 20 which supplies a negative DC voltage to either one of the third electrode 23 and the fourth electrode 24, and simultaneously supplies an AC voltage to the other of the third electrode 23 and the fourth electrode 24.

Besides the above-mentioned two representative configurations, the configurations described in embodiments 1 to 2 (FIG. 1 to FIG. 9) may be adopted where a movable-floor-type placing portion formed of a belt, a fixed-type enclosure structure and a lid plate are combined with each other. The configuration described in respective examples (a) to (d) of an embodiment 3 (FIG. 10) may also be adopted where a placing portion and an enclosure structure are integrally formed into a hermetically sealed box shape which functions as a fixed floor as well as a moving floor. The configuration described in an embodiment 4 (FIG. 11) may also be adopted where a placing portion and an enclosure structure are integrally arranged in the inside of an open-type shelf box, and the placing portion and the enclosure structure are movably conveyed by a movable-type compartment 4. There may be also provided the configuration described in an embodiment 5 where a hook type fixed portion 7F and a projecting frame 71 structure which projects from both side portions of the fixed portion 7F are formed into an integral body, and the integral body is moved in a suspended manner by a wire W. Further, the placing portion of one embodiment selected from these embodiments and the enclosure structure of another embodiment selected from these embodiments may be combined with each other, or these elements may be picked up and be combined with each other while changing shapes of these elements or changing the number of these elements. For example, the suspension moving method using the wire W or the moving floor method using the conveyance belt may be changed to a moving method where a placing portion and an enclosure structure are moved along a string way formed on a floor string or a moving type using wheels shown in FIG. 11. In this case, the configurations of moving mechanisms shown in the respective embodiments may be adopted. However, it is also possible to adopt other known configurations.

(Constitutional Example in Respective Embodiments)

Provided that the preservation treatment apparatus includes at least the electrode arrangement substantially equal to the electrode arrangement having the above-mentioned configuration, the preservation treatment apparatus may adopt the configuration of another enclosure structure, may add another electrode arrangement, or may combine these constitutional elements. To be more specific, with respect to the specific constitutions illustrated as the embodiments of the present invention, at least the following constitutional examples are considered.

(Constitutional Examples of the Placing Portion 1 and the Enclosure Structure According to Respective Embodiments)

The constitution of the embodiment 1 which adopts a floor-moving-type preservation treatment apparatus where a placing portion 1 is formed of a large number of belt pieces 1B connected with each other, and a floor is movable due to the rotation of the large number of belt pieces 1B by belt rolls R (FIG. 1 to FIG. 8).

The constitution of the embodiment 1 where the enclosure structure adopts the frame structure 3 formed of a connection frame which extends over both sides and upper and lower sides of the placing portion 1 in a cubic shape, and a lid plate S which extends between upper ends of both side portion frames 31, 32 which form an upper portion of the frame structure 3 is disposed openably and closably thus covering all of four peripheries and an upper side of the placing portion 1 by the frame structure 3 and the lid plate 5 (FIG. 1 to FIG. 8).

Figure 9:
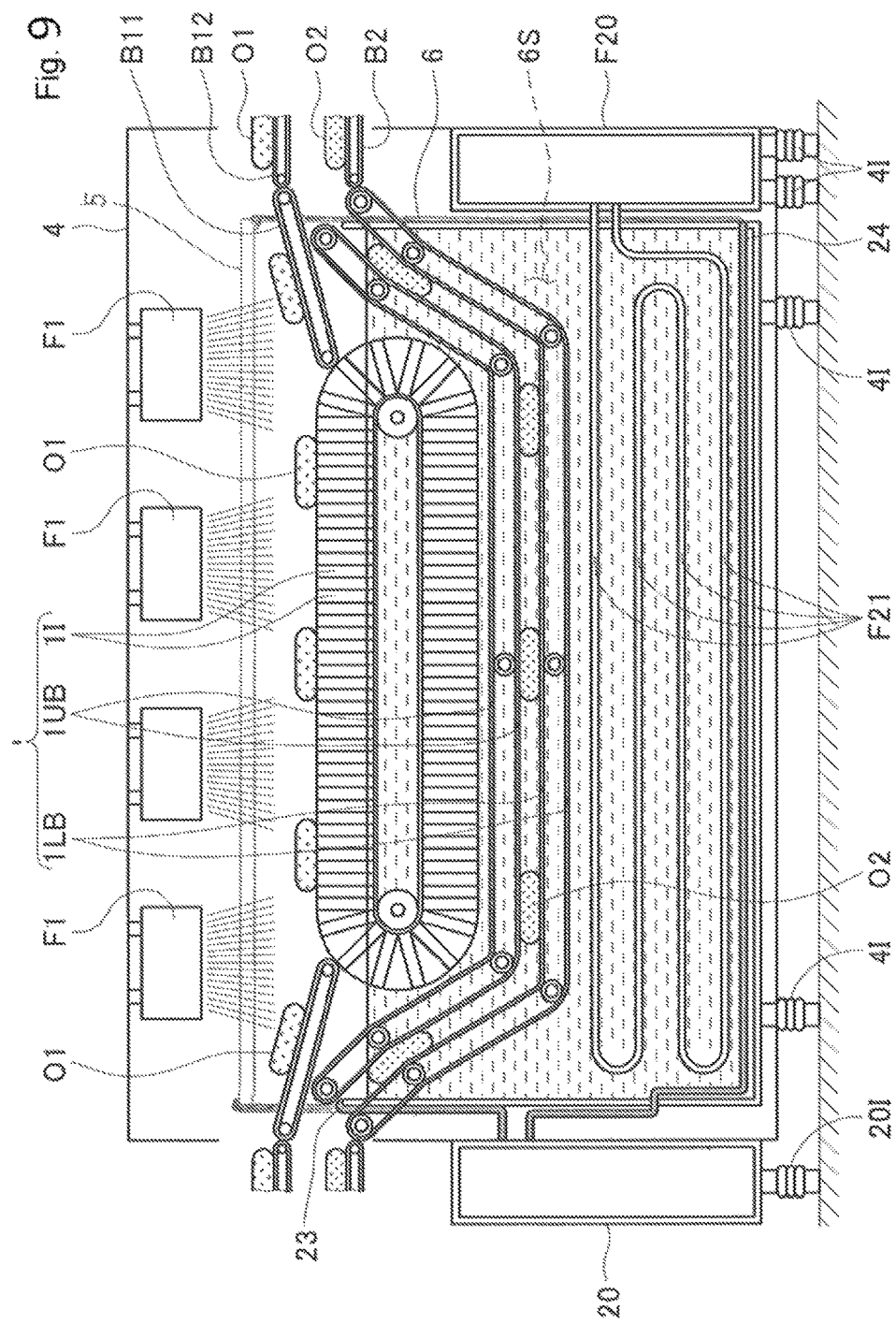
FIG. 9 is a cross-sectional structure explanatory view showing a preservation treatment apparatus according to an embodiment 2 of the present invention.

The constitution of the embodiment 2 where a floor movable type preservation treatment apparatus is adopted, wherein the placing portion 1 is formed of an ingot belt by connecting a large number of ingots 11 made of metal ingot in a belt shape (an upper portion of FIG. 9).

The constitution of the embodiment 2 where the enclosure structure is formed of a water tank 6 which is wholly disposed below an area close to a lower half portion of an upper belt of the ingot 1I of the placing portion 1 and surrounds four peripheral sides of the ingot belt, and a hollow lid 5 which is hollow and fixed is arranged above the ingot belt by a frame raised upright from the periphery of the water tank 6 (belt conveyance freezing applied to a first object O1 shown in an upper portion of FIG. 9).

The constitution of the embodiment 2 which adopts a movable preservation treatment apparatus where the placing portion 1 and the enclosure structure are sandwiched by upper and lower sandwiching belts which are formed of a lower belt 1LB formed of a large number of conveyance belts arranged in the inside of the water tank and an upper belt 1UB arranged parallel to an upper portion of the lower belt 11LB with an object sandwiched therebetween (FIG. 9).

The constitution of the embodiment 2 where the enclosure structure is configured such that the inside of the water tank 6 is filled with an electrolytic refrigerant solution 6S so that the whole peripheral portion of an object is filled with an electrolytic solution (liquid freezing applied to a second object O2 described in a lower portion of FIG. 9).

Figure 10:
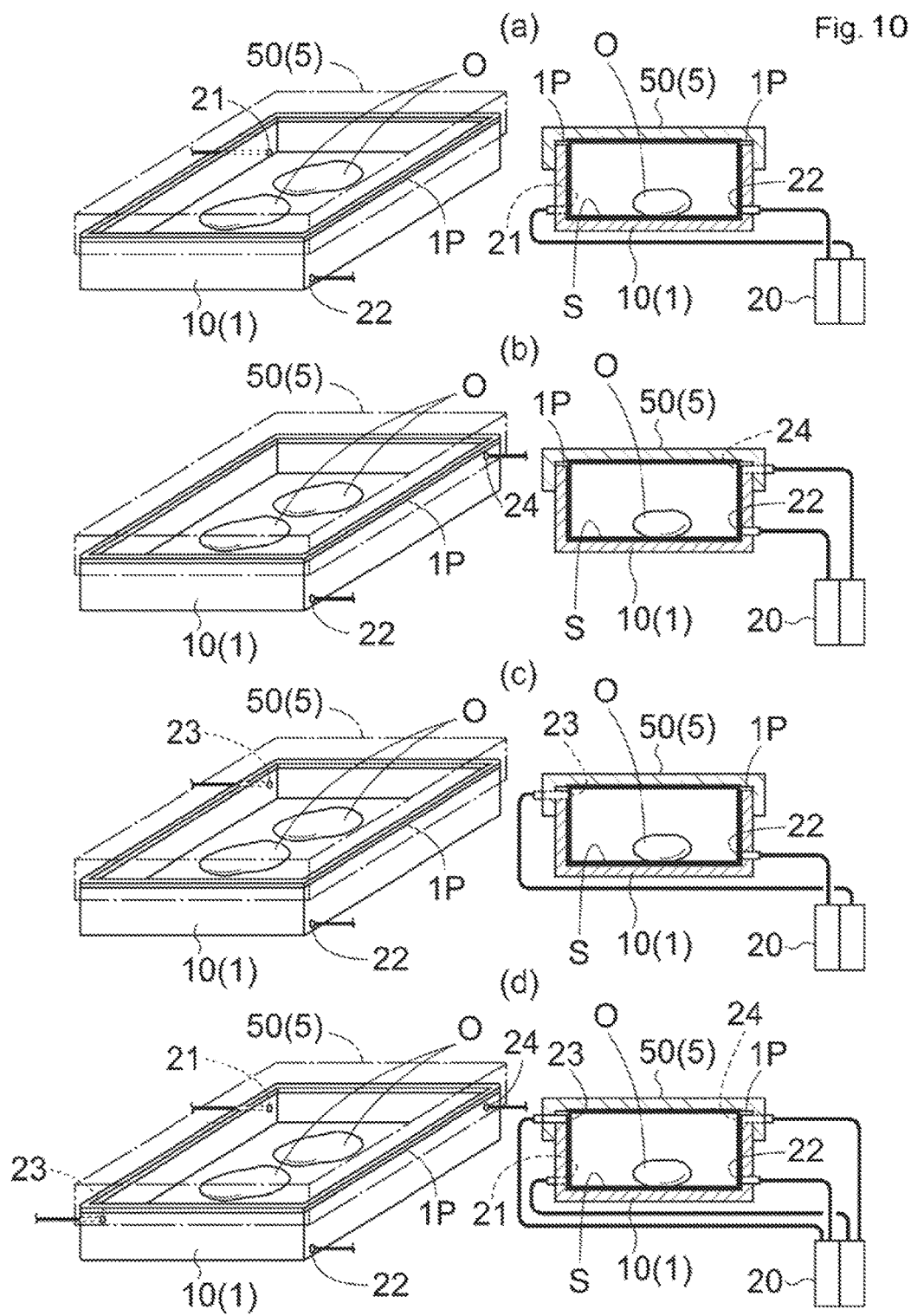
FIG. 10 is a perspective and cross-sectional structure explanatory view of a placing box and a lid frame showing constitutional examples (a), (b), (c) and (d) of a preservation treatment apparatus according to an embodiment 3 of the present invention.

The respective constitutions (a), (b), (c), (d) of an embodiment 3 where a placing portion 1 and the enclosure structure are formed of a placed box 10 having peripheral side walls contiguously raised from a placing floor plate and having an opening on an upper side thereof, and the preservation treatment apparatus is hermetically sealed by the placed box 10 and a lid frame 50 which is formed by integrally joining a four side frame to a lid plate 5 which covers the upper opening of the placed box 10 by way of a conductive packing 1P having a four side frame (FIG. 10).

Figure 11:
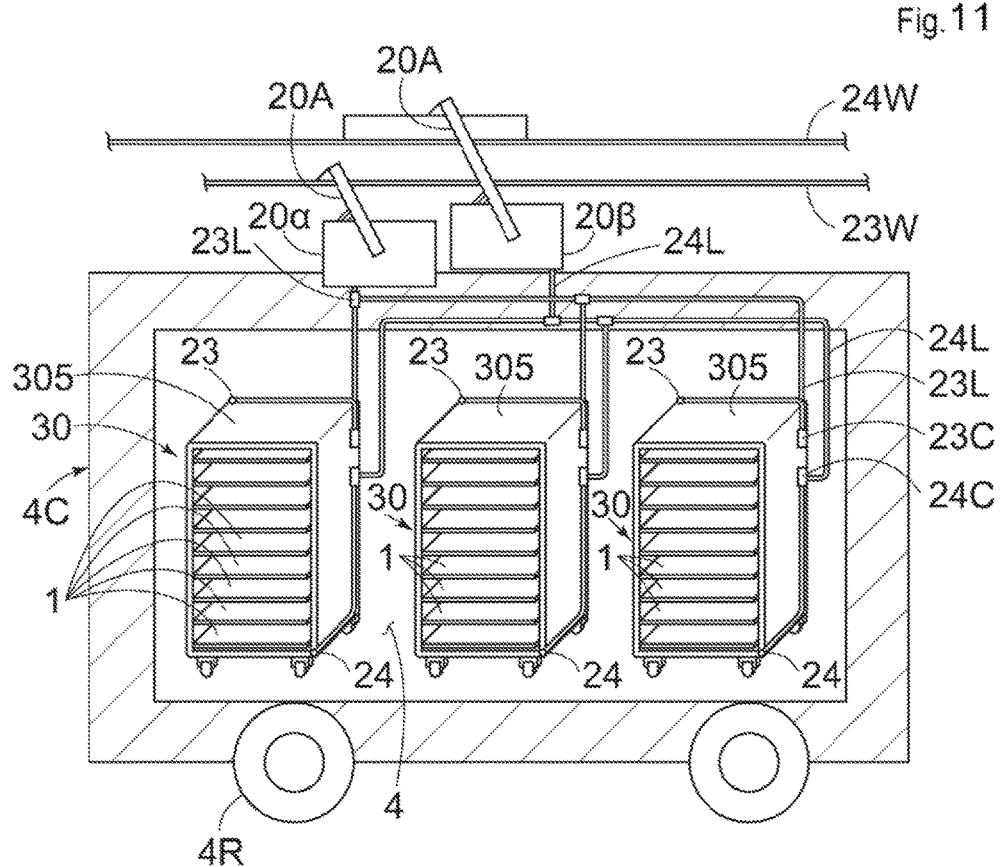
FIG. 11 is a semi cross-sectional structure explanatory view showing the constitution of a preservation treatment apparatus according to an embodiment 4 of the present invention.

The constitution of an embodiment 4 where a placing portion 1 is formed of a plate-like placing tray, a plurality of placing trays the number of which corresponds to a plurality of objects O are prepared, and an enclosure structure is formed of a shelf frame 30 equipped with casters having the shelf fixing structure which stores a plurality of placing trays in a shelf state (FIG. 11).

Figure 12:
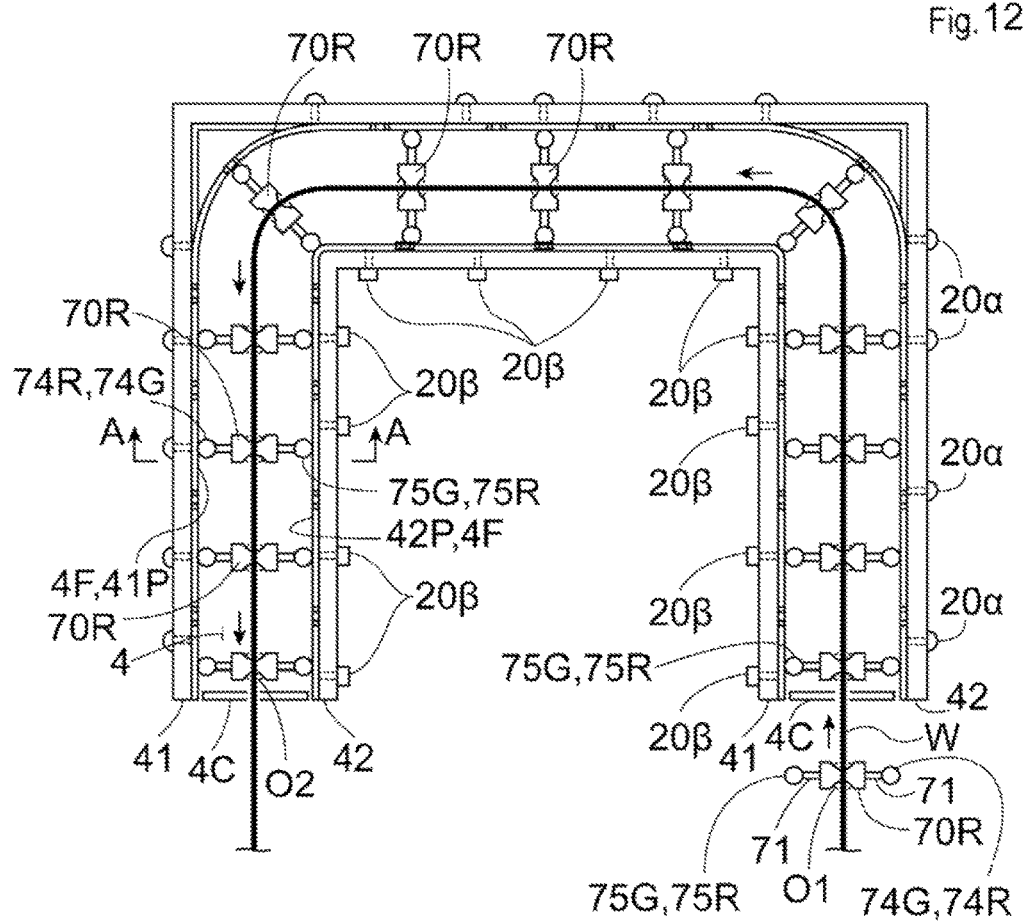
FIG. 12 is a planer structure explanatory view showing the constitution of a preservation treatment apparatus according to an embodiment 5 of the present invention.
Figure 13:
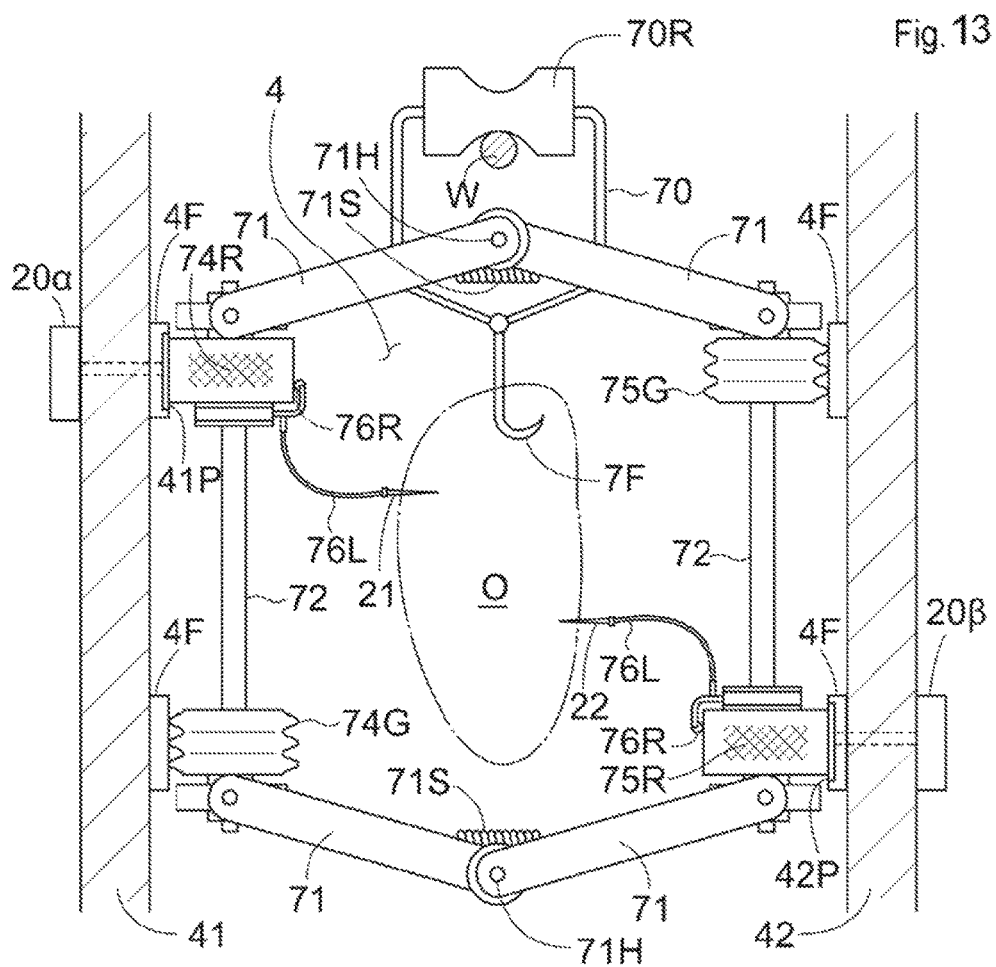
FIG. 13 is a cross-sectional explanatory view taken along a line A-A in FIG. 12 showing the constitution of the preservation treatment apparatus according to the embodiment 5 of the present invention.

The constitution of an embodiment 5 where to preservation treatment apparatus includes a fixing hook 7F which engages with an object O in a pierced state as a fixing portion in place of a placing portion 1, and an enclosure structure has the projecting frame structure having a projecting frame 71 which projects toward both sides of the fixing hook 7F (FIG. 12, FIG. 13).

(Constitutional Examples of Electrode Arrangement According to Respective Embodiments)

The constitution of the embodiment 1 where the arrangement of the respective electrodes of the electrode set on the placing portion 1 is performed in a diagonal line direction (toward rightward and upward side and a leftward and downward side facing each drawing) of a cross section of a belt piece 1B as viewed from an advancing direction of the belt piece 1B (FIG. 2 to FIG. 5) due to contacts at two points consisting of a roller contact 21R on an upper surface side in the vicinity of one side edge portion 11S of the belt piece 1B and a roller contact 22R on a lower surface side in the vicinity of the other side edge portion 12S of the belt piece 1B.

The constitution of the embodiment 2 where the arrangement of the respective electrodes of the electrode set in the inside of the water tank 6 which is the enclosure structure is performed in a diagonal line direction (toward a rightward and downward side and a leftward and upward side facing each drawing) of a side surface of the water tank 6 as viewed in a side view of each belt (FIG. 9) due to contacts at two points consisting of a contact of a third electrode 23 fixed to an upper end portion of a front wall (on a left side facing FIG. 9) of the water tank 6 and a contact of a fourth electrode 24 fixed to an inner corner of a bottom portion of a rear wall (on a right side facing FIG. 9) of the water tank 6.

The constitution of the embodiment 3 (a) where the arrangement of electrodes in the inside of the hermetically sealed box formed of the placing box 10 which is the placing portion 1 as well as the enclosure structure and the lid frame 50 is performed in a spaced apart manner in a diagonal line direction (toward a rightward and upward side and a leftward and downward side in a plan view) of a placing surface of the placing box 10 as viewed in a plan view due to contacts at two points consisting of a first electrode 21 fixed to a rear side (a left deep side facing FIG. 10 (a)) of one side wall and a second electrode 22 fixed to a front side (a right front side facing FIG. 10(a)) of the other side wall, wherein both contacts are at a height of a lower portion of a wall surface close to a placing surface (FIG. 10(a)).

The constitution of the embodiment 3 (b) where the arrangement of electrodes in the inside of the hermetically sealed box formed of the placing box 10 which is the placing portion 1 as well as the enclosure structure and the lid frame 50 is performed in a spaced apart manner in a diagonal line direction (toward a leftward and downward side and a rightward and upward side in a right side view) of one side wall of the placing box 10 as viewed in a side view due to contacts at two points consisting of a second electrode 22 fixed to a lower portion of a wall surface of a front side (a right front side facing FIG. 10 (b)) of the other side wall and a fourth electrode 24 fixed to an upper portion of a wall surface of a rear side (a right deep side facing FIG. 10 (b)) of the other side wall, wherein both contacts are on the same wall and differ from each other in height and position (FIG. 10 (b)).

The constitution of the embodiment 3 (c) where the arrangement of electrodes in the inside of the hermetically sealed box thrilled of the placing box 10 which is the placing portion 1 as well as the enclosure structure and the lid frame 50 is performed in a spaced apart manner in a diagonal line direction (toward a leftward and downward side and a rightward and upward side in a see-through side view) of a placing surface of the placing box 10 as viewed in a see-through side view due to contacts at two points consisting of a third electrode 23 fixed to an upper portion of a wall surface of a rear side (a left deep side facing FIG. 10 (c)) of one side wall and a second electrode 22 fixed to a lower portion of a wall surface of a front side (a right front side facing FIG. 10 (c)) of the other side wall, wherein both contacts are arranged in left and right point symmetry such that two points are arranged at different heights and positions of respective side walls (FIG. 10 (c)).

The constitution of the embodiment 3 (d) where the arrangement of electrodes in the inside of the hermetically sealed box formed of the placing box 10 which is the placing portion 1 as well as the enclosure structure and the lid frame 50 is performed by providing two sets of electrode each of which consists of two electrodes in an arbitrary combination due to contacts at four points consisting of a first electrode 21 fixed to a lower portion of a wall surface of a rear side (a left deep side facing FIG. 10 (d)) of one side wall, a second electrode 22 fixed to a lower portion of a wall surface of a front side (a right front side facing FIG. 10(d)) of the other side wall, a third electrode 23 fixed to an upper portion of a wall surface of a front side (a left front side facing FIG. 10 (d)) of one side wall, and a fourth electrode 24 fixed to an upper portion of a wall surface of a rear side (a right deep side facing FIG. 10 (d)) of the other side wall in the embodiment 3 (d), two electrode sets consisting of the first electrode set which is formed of the first electrode on a left upper side and the second electrode on a right, lower side as viewed in a top plan view and the second electrode set which is formed of the third electrode on a right upper side and the fourth electrode on a left lower side as viewed in a top plan view are provided as the conceptual constitutions. At the same time, two electrode sets consisting of the third electrode set which is formed of the fourth electrode on a left upper side and the second electrode on a right lower side as viewed in a right side view and the fourth electrode set which is formed of the third electrode on a right upper side and the first electrode on a left lower side as viewed in a left side view are provided as the conceptual constitutions. In all respective electrode sets provided as the conceptual constitutions, two electrodes which form the set are arranged at point symmetry positions, that is, in a spaced-apart manner from each other in the diagonal line direction as viewed in a top plan view or as viewed in a side view. With respect to the symmetrical direction of two sets of electrode sets, as viewed in a top plan view or as viewed in a side view in a see-through manner, the respective sets have the arrangement directions spaced apart from each other in the diagonal line directions symmetrical to each other.

The constitution of the embodiment 4 where the respective electrodes of the electrode sets in the shelf frame 30 which is the enclosure structure are arranged in the diagonal line direction of the lid surface 305 as viewed in a top plan view of the shelf frame 30 (a left upper side and a right lower side as viewed in a top plan view) by two-point contacts consisting of a contact of the third electrode 23 fixed to a corner portion of an upper end of a front side (a left deep side facing FIG. 11) of one side wall of the shelf frame 30 and a contact of the fourth electrode 24 fixed to a corner portion of a lower end of a rear side (a right front side facing FIG. 11) of the other side wall of the shelf frame 30.

The constitution of the embodiment 5 (FIG. 12 and FIG. 13) where the respective electrodes of the bulging frame structure which is the enclosure structure are arranged in a spaced-apart manner in the diagonal line direction (on a left upper side and a right lower side as viewed in a top plan view) around an object O in a suspended state as viewed in a from view of the advancing direction of the object O by two-point contacts consisting of a contact of the first electrode 21 electrically connected by an electric connecting line 76L from a contact roller 74R mounted on an upper end of a frame bar 72 in the vicinity of an upper bulging frame 71 on one side (a left upper side facing FIG. 13) and a contact of the first electrode 22 electrically connected by an electric connecting line 76D from a contact roller 75R mounted on a lower end of a frame bar 72 in the vicinity of a lower bulging frame 71 on the other side (a right lower side facing FIG. 13).

(Voltage Supply Portion 20)

Out of the above-mentioned constitutional elements, the voltage supply portion 20 simultaneously applies a negative DC voltage to either one of the first electrode 21 and the second electrode 22 and an AC voltage to the other one of the first electrode 21 and the second electrode 22, and the voltage supply portion 20 simultaneously applies a negative DC voltage to either one of the third electrode 23 and the fourth electrode 24 and an AC voltage to the other one of the third electrode 23 and the fourth electrode 24.

The first electrode and the second electrode are brought into contact with both side portions of the placing portion 1 respectively, and a negative DC voltage and an AC voltage are simultaneously applied to the electrodes respectively. Due to such a constitution, the flow of an electric current from one terminal to the other terminal can be periodically changed in a short time so that a generation state of an electric energy field can be maintained while periodically changing the generation state of the electric energy field.

(Applied Potential)

Particularly, it is preferable that a negative DC voltage be a negative potential which corresponds to an object, and an absolute value of the potential be equal to or smaller than a maximum potential of an AC voltage. By applying a negative DC potential from the other electrode while applying an AC potential from one electrode, an inner surface side of the placing portion and the enclosure structure formed of a conductor, that is, a side where the object O is stored can be held at a negative potential with a periodical change in potential, that is electric oscillations. By storing an object in such a space, the whole area around the object is charged with positive ions. Further, by imparting electrical vibrations to the object by simultaneously applying an alternating current to the object, the progress of an oxygen activity of oxide in the object can be suppressed thus suppressing the progress of acidification or putrefaction of the object. During such simultaneous applying of an alternating current, pH of the object per se is slightly increased (approximately 0.1 to 2.0). When an object is a biomaterial or fresh food, it is preferable that a voltage potential to be applied do not exceed 10,000 V/cm in terms of an absolute value. An AC electric energy necessary for maintaining a cell is extremely small so that when an electric energy of an AC potential largely exceeding the limit is continuously applied to an object, a cell wall or a cell nucleus is broken whereby a cytoplasm (meat quality in case of a meat product) is deteriorated. It is also preferable that the voltage supply portion 20 simultaneously apply a negative DC voltage equal to the voltage applied to the first electrode 21 to either one of the third electrode 23 and the fourth electrode 24 and an AC voltage equal to the voltage applied to the second electrode to the other one of the third electrode 23 and the fourth electrode 24. By allowing the third electrode 23 and the fourth electrode 24 to have the same voltage applying constitution as the first electrode 21 and the second electrode 22, the adjustment of a potential and a control can be easily performed.

(Arrangement of Electrodes)

It is necessary to arrange the electrodes on both sides separately with the object disposed therebetween, that is, one electrode on one side of the object and the other electrode on the other side of the object. Electricity flows in the direction along which electricity can easily flow and hence, when the electrodes are not arranged uniformly, an electric effect given to an object is reduced. In a conductor which is an object to which the electrodes are brought into contact, particularly, in a conductor having a large thickness such as the placing plate on which an object is directly placed, it is preferable that one electrode be brought into contact with an upper portion of one side portion of the conductor, and the other electrode be brought into contact with a lower portion of the other side portion of the conductor. By making an electric current flow not only through an upper surface of the conductor but also through the inside and a lower surface of the conductor, a charged state of the conductor can be held in a more intensive state so that an electric energy field can be stabilized.

(Enclosure Structure)

It is preferable that, in addition to the placing plate made of a conductive material, the enclosure structure made of a conductive material be formed on at least either one of peripheral sides or an upper side of an object. In this case, electric energy can be generated by the placing plate on which the object is placed and, at the same time, electric energy can be generated also by the enclosure structure. By surrounding the lower side and the peripheral sides of the object or the lower side and the upper side of the object by the charged conductive material, it is possible to give an effect generated by an electric energy field to the object in a superimposed manner so that an electric effect can be given to the object more effectively.

Here, as a technique for surrounding an object by a conductive member, it is preferable that two or more surrounding surfaces of the enclosure structure (surfaces covering a lower surface and a peripheral surface of the object or a lower surface and an upper surface of the object) be covered by metal-made conductive fibers S. In this case, by lining and fixing metal-made conductive fibers S to a placing surface and inner surfaces of the surrounding surfaces of the enclosure structure, a state is brought about where the periphery or the whole upper portion of the object O is covered by metal-made conductive fibers S. In this case, for example, as in the case of the embodiment 3, it is preferable that at least metal-made conductive fibers S hermetically wrap the periphery of an object by a technique where metal-made conductive fibers S are laminated to the whole inner surface of a box which surrounds an object as lining. Further, for example, as in the case of the stereoscopic frame structure described in the embodiment 1, it is preferable that metal-made conductive fibers S extend over and be fixed to at least the whole peripheral surface (both side surfaces and front and rear surfaces) of the frame structure along the outermost frame. It is more preferable that metal-made conductive fibers S also extend over and be fixed to a bottom surface of the frame structure. Still further, when the lid plate 5 described in the embodiments 1, 2 is used, it is preferable that the metal-made conductive fibers S be laminated to an upper surface of the placing surface and a lower surface of the lid plate so that a state is brought about where an object O on the placing surface is sandwiched between above and below by metal-made conductive fibers S. With the use of conductive fibers having air permeability and light transmissivity as metal-made conductive fibers laminated to the lid plate 5, a temperature control and a state control based on observation with naked eyes are facilitated.

Metal-made conductive fibers may be formed by dispersing and fixing conductive metal in synthetic fibers or by covering a surface of organic fibers by metal or a resin containing metal. For example, it is preferable that weak negative charged metal oxide such as copper sulfide, iron sulfide or nickel oxide be chemically bonded to acrylic fibers or nylon fibers. Those metals have a slight negative charge and exhibits a function of making a charge environment in conductive fibers S uniform.

The enclosure structure is made of a conductive material (conductor), is arranged on at least either one of both sides or an upper side of the placing portion 1, and surrounds at least either one of both sides or an upper side of the object O as viewed from the object O placed on the placing surface. For example, the enclosure structure may include lid plates 5 arranged above at least the placing plate and expanding in the planar direction. It is preferable that an upper position of the lid plate 5 close to one side portion of the lid plate 5 and a lower position of the lid plate 5 close to the other side portion of the lid plate 5 be brought into contact with the third electrode and the fourth electrode respectively so that the lid 5 to which electricity is applied by the voltage supply portion form an electric energy field above the object O placed on the placing surface.

The enclosure structure may also be configured to include wall plates which are arranged at least on both sides of the placing plate, and are raised upwardly from the placing plate. Here, it is necessary for the left and right wall plates on both side portions to be electrically connected with each other thus forming an integrally thrilled conductor. Out of the left and right wall plates on both side portions which are electrically connected with each other, an upper position of the wall plate close to one side portion as viewed from the object and a lower position of the wall plate close to the other side portion as viewed from the object are brought into contact with the third electrode and the fourth electrode respectively. Due to such a constitution, the wall plates 5 to which electricity is applied by the voltage supply portion form an electric energy field at both side portions of the object O placed on the placing surface.

The enclosure structure may also be configured to include both the lid plates 5 arranged above the placing plate and expanding in the planar direction and the wall plates which are arranged on both sides of the placing plate, brought into contact with both side portions of the lid plate 5 respectively, and raised upwardly from the placing plate as an integral body. By forming the lid plates and the wall plates as an integral body in this manner, the enclosure structure adopts the conductor structure having an inverted U shaped cross section as viewed in a front elevation view. Alternatively, the enclosure structure adopts the conductor structure having a rectangular cross section as viewed in a front elevation view by connecting a bottom plate to the conductor structure having an inverted U shaped cross section. In such cases, for example, the third electrode is brought into contact with an upper end of one wall plate and the fourth electrode is brought into contact with an upper end of the other wall plate, and a negative DC voltage and an AC voltage are simultaneously applied to the third electrode and the fourth electrode respectively. Due to such a constitution, both the wall plates and the lid plates can be brought into a state where a negative DC voltage and an AC voltage are simultaneously applied to these plates so that an electric energy field which surrounds three peripheral sides of the placing plate can be generated. Alternatively, in such cases, the lid plates and the wall plates extending on left and right sides respectively may be formed independently from each other, and the third electrode and the fourth electrode may be brought into contact with both side portions of the respective plates.

The preservation treatment apparatus of the present invention may further include, as the basic constitution thereof, a chamber 4 formed so as to surround the placing portion 1 and both sides or an upper portion of the enclosure structure 3/5, and a temperature adjuster F which cools the inside of the chamber 4.

By applying a negative DC voltage and an AC voltage to the electrodes by the voltage supply portion 20 and, at the same time, by controlling a temperature of the object O placed on the placing portion 1 by the temperature adjuster F, it is possible to bring the object into a preservation state while placing the object in an electric energy field. Hereinafter, the constitution and the structure of the respective embodiments are described in detail.

[Embodiment 1]

A preservation treatment apparatus of an embodiment 1 shown in FIG. 1 to FIG. 8 is a tunnel-type freezer which includes the belt structure where conductive belt pieces 1B are connected together in an annular shape, and a chamber 4 formed of a tunnel-like space surrounding side portions and an upper portion of the belt structure. To be more specific, the preservation treatment apparatus of the embodiment 1 includes: a placing portion 1 having a conductive placing surface on which an object O is placed; a conductive enclosure structure 3/5 arranged at least either one of both sides or an upper side of the placing portion 1, and surrounding at least either one of both sides or the upper side of the object O as viewed from the object O placed on the placing surface; and a voltage supply portion 20 which is electrically connected with the first electrode 21, the second electrode 22, the third electrode 23 and the fourth electrode 24 respectively.

The preservation treatment apparatus includes: roller contacts 21R, 22R brought into contact with an upper portion of one edge and a lower portion of one edge of the belt pieces 1B respectively, the belt pieces 1B being disposed on an upper side and pass and move through the respective portions where the roller contacts are disposed. Due to such belt structure, an electric energy field is generated in a conveyance space by applying electricity during a period where the object O on the belt pieces 1B is conveyed.

(Electrodes)

In the embodiment 1, the preservation treatment apparatus includes four electrodes consisting of first electrodes 21 brought into contact with upper positions of the placing portion 1 close to one side portion 11S of the placing portion 1 as viewed from the object O placed on the placing portion 1; second electrodes 22 brought into contact with lower positions of the placing portion 1 close to the other side portion 12S of the placing portion 1 as viewed from the object O placed on the placing portion third electrodes 23 brought into contact with positions of the enclosure structure 3/5 close to one side portion of the enclosure structure 3/5 as viewed from the object O placed on the placing portion 1; and fourth electrodes 24 brought into contact with positions of the enclosure structure 3/5 close to the other side portion of the enclosure structure 3/5 as viewed from the object O placed on the placing portion 1.

(Application of Voltages)

The voltage supply portion 20 simultaneously applies a negative DC voltage of 300V to 6000V to either one of the first electrode 21 and the second electrode 22 and an AC voltage having a potential which does not exceed a potential of the negative DC voltage to the other one of the first electrode 21 and the second electrode 22. At the same time, the voltage supply portion 20 simultaneously applies a negative DC voltage of 300V to 6000V to either one of the third electrode 23 and the fourth electrode 24 and an AC voltage having a potential which does not exceed a potential of the negative DC voltage to the other one of the third electrode 23 and the fourth electrode 24.

In this embodiment, the voltage supply portion 20 of the embodiment 1 simultaneously applies a negative DC voltage equal to the voltage applied to the first electrode 21 to either one of the third electrode 23 and the fourth electrode 24 and an AC voltage equal to the voltage applied to the second electrode 22 to the other one of the third electrode 23 and the fourth electrode 24.

(Placing Portion 1)

The placing portion 1 of the embodiment 1 is formed of the belt structure which includes: a belt body constituted of a large number of belt pieces 1B connected together in a belt shape; and a plurality of belt rolls R for controlling belt rotation by being brought into contact with respective inner surfaces of a front side and a rear side of the belt body in an advancing direction of the belt body. The first electrode 21 and the second electrode 22 in the embodiment 1 are arranged as a pair on left and right sides respectively at a plurality of arrangement portions of the belt structure along the belt advancing direction such that the first electrode 21 and the second electrode 22 are brought into contact with one or the other of an upper surface of one end and a lower surface of one end of the belt pieces 1B on an upper side of the belt body.

Each belt piece 1B of the belt body is formed of a thin plate formed of a conductor. A side plate 11 formed of a conductor is fixed to the belt piece 1B at a portion in the vicinity of one side portion 11S in a raised manner, and a side plate 12 formed of a conductor is fixed to the belt piece 1B at a portion in the vicinity of the other side portion 12S in a raised. manner. End portions of the belt piece 1B which extend outward in the side ward direction from the side plates 11, 12 are brought into contact with the first and second electrodes 21, 22 arranged in a spaced-apart manner.

(First, Second Electrodes)

Figure 5:
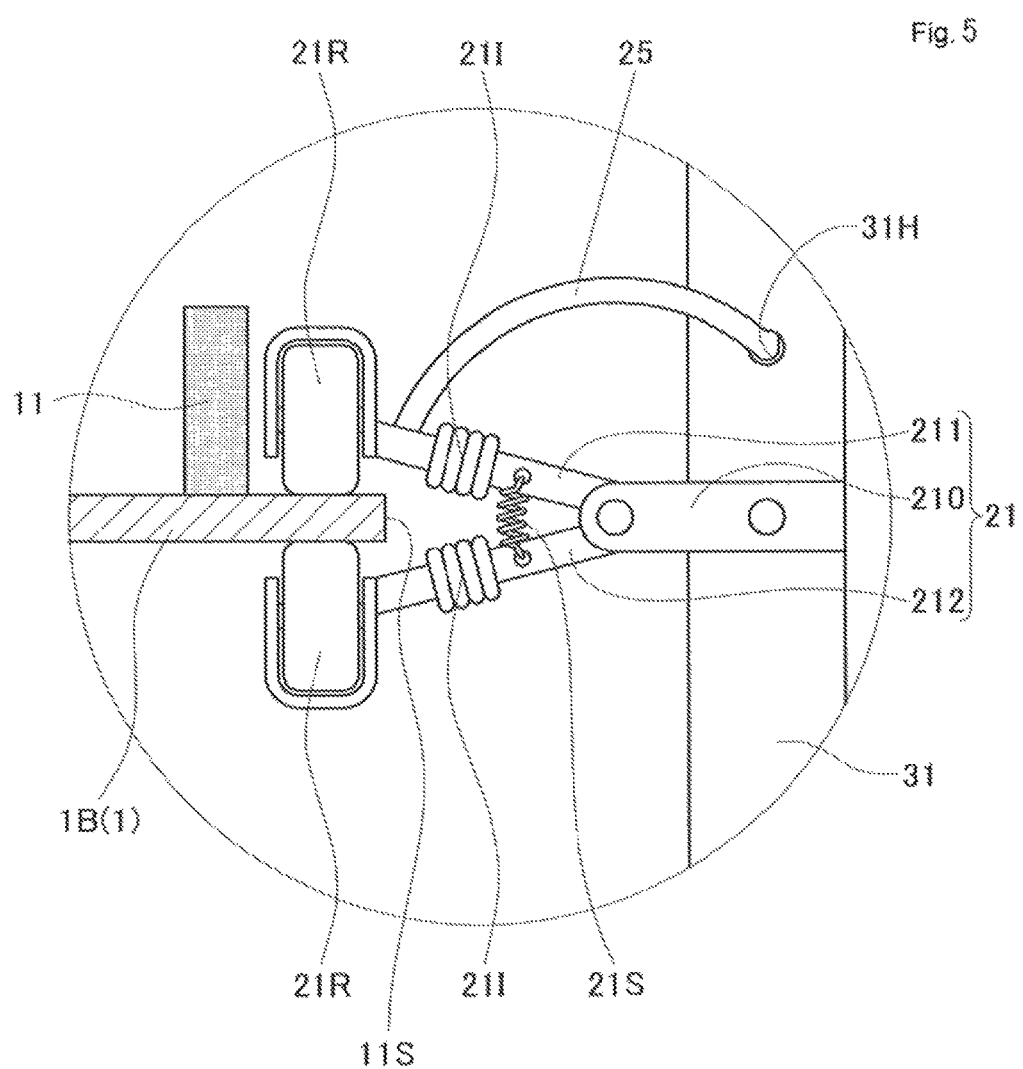
FIG. 5 is a partially enlarged view as viewed in a front elevation view of a portion B (structure of a first electrode and parts in an area around the first electrode) in FIG. 2.

The first electrode 21 is basically constituted of a proximal arm 210 which is connected to the side frame member 31 and extends inwardly; an upper arm 211 which is pivotally supported on an inner side of a holding arm 211 by way of a penetrating pin, and is rotatable in the upward direction; and a lower arm 212 which is pivotally supported on the inner side of the holding arm 211 below the upper arm 211 by way of the same penetrating pin, and is rotatable in the downward direction (FIG. 5). The upper arm 211 and the lower arm 212 are supported about the pivotally supported portions with respect to the proximal arm 210 and, at the same time, extend in the obliquely upward direction and in the obliquely downward direction respectively. A spring 11S extends between the upper arm and the lower arm, and automatically adjusts an open angle made between the arms within, a predetermined, range. A freely rotatable roller contact 21R is supported by way of a frame on a distal end of the upper arm 211 and a distal end of the lower arm 212 respectively. The upper and lower roller contacts 21R are brought into contact with the belt piece 1B such that the upper and lower roller contacts 21R sandwich upper and lower portions of a one side end portion 11S of the belt piece 1B. The upper arm 211 and the lower arm 212 have an elongated rod shape, and an insulator 211 is interposed at center portions of the upper arm 211 and the lower arm 212 respectively. An electrode line 25 which is electrically connected with the voltage supply portion 20 is connected only to the upper arm 211.

Figure 6:
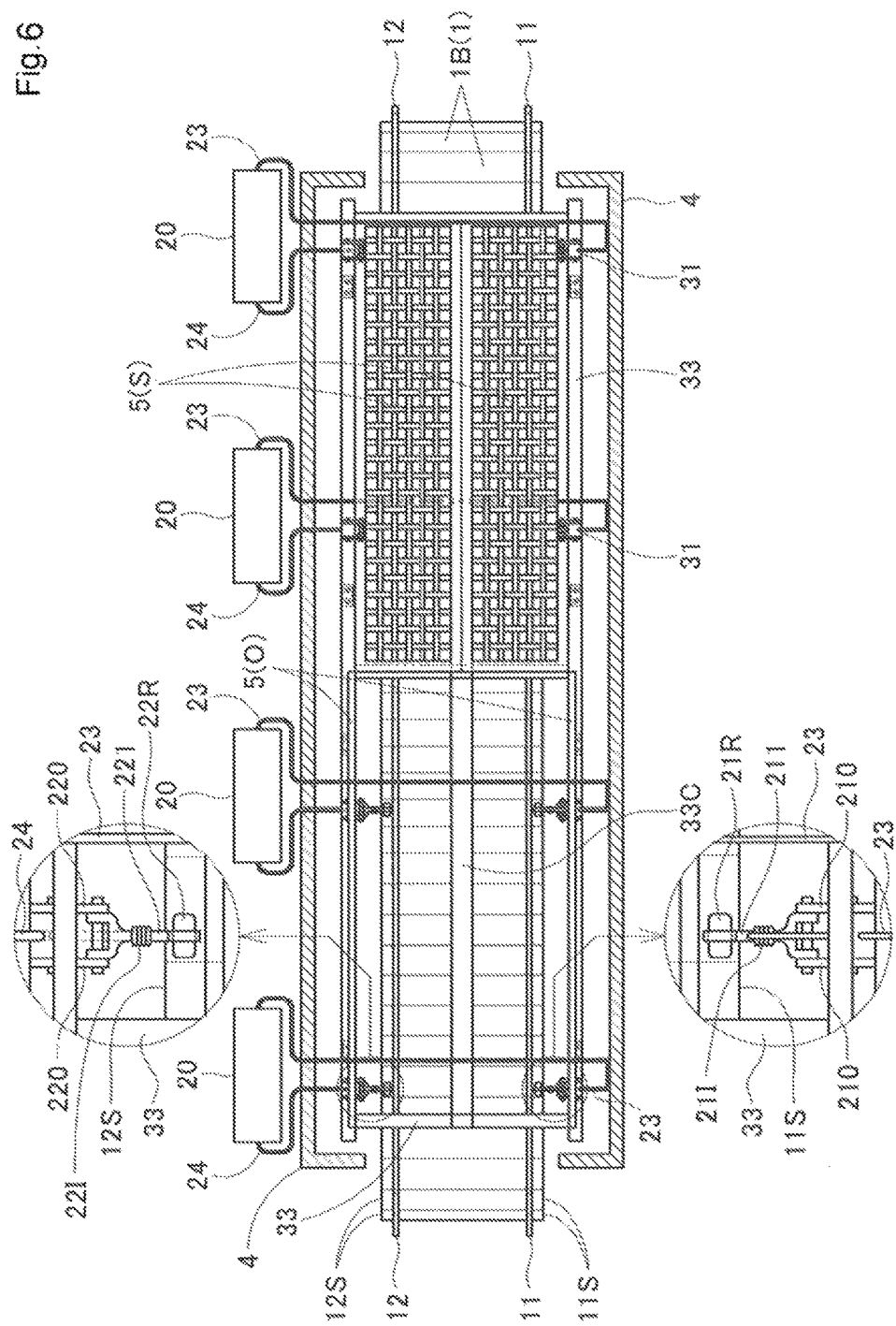
FIG. 6 is an appearance view as viewed in a plan view and a partially enlarged view of the preservation treatment apparatus according to the embodiment 1 in a state where some lid plates are opened.
Figure 7:
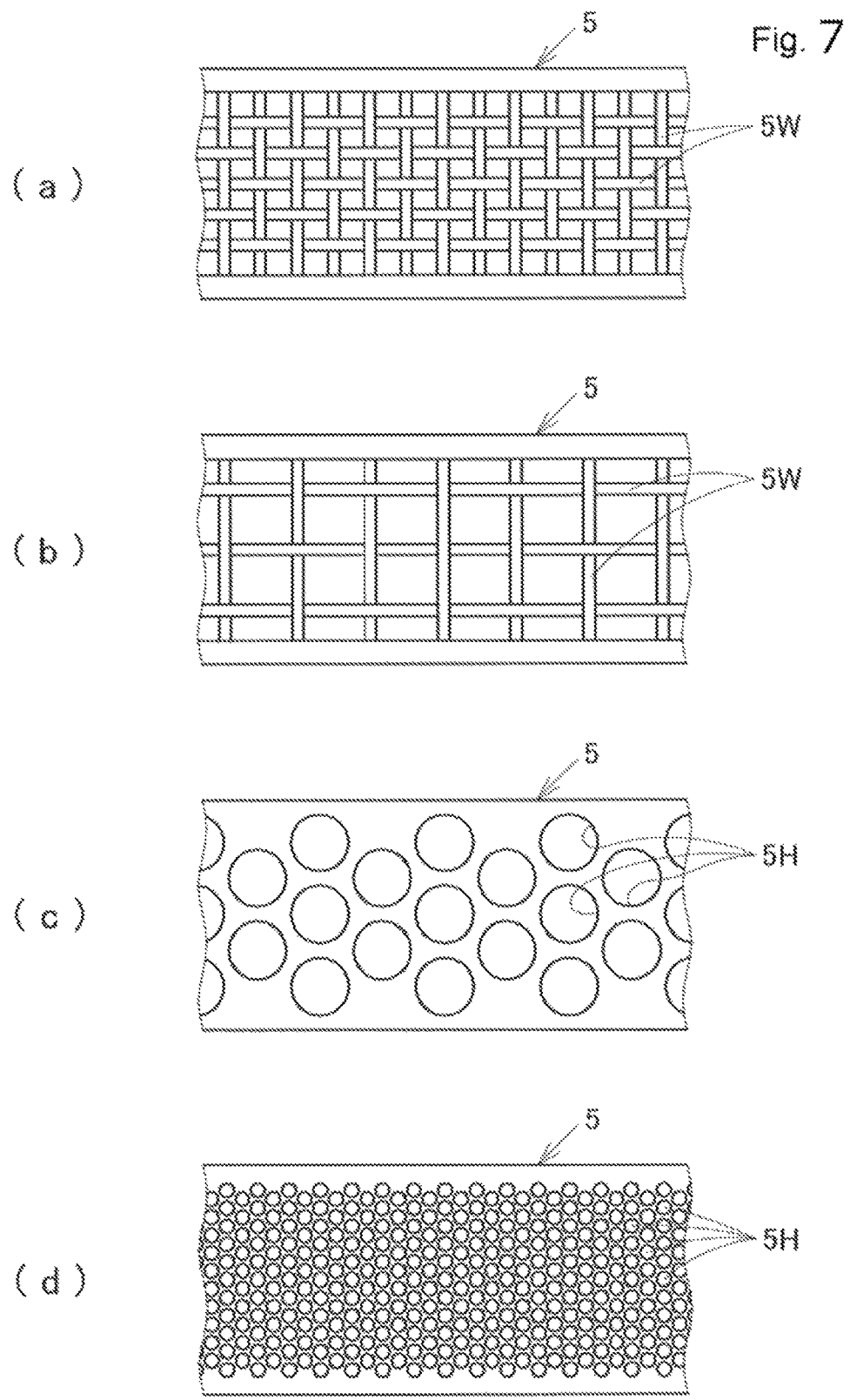
FIG. 7 is a planer explanatory view showing variation examples of a shape of holes formed in the lid plate.
Figure 8:
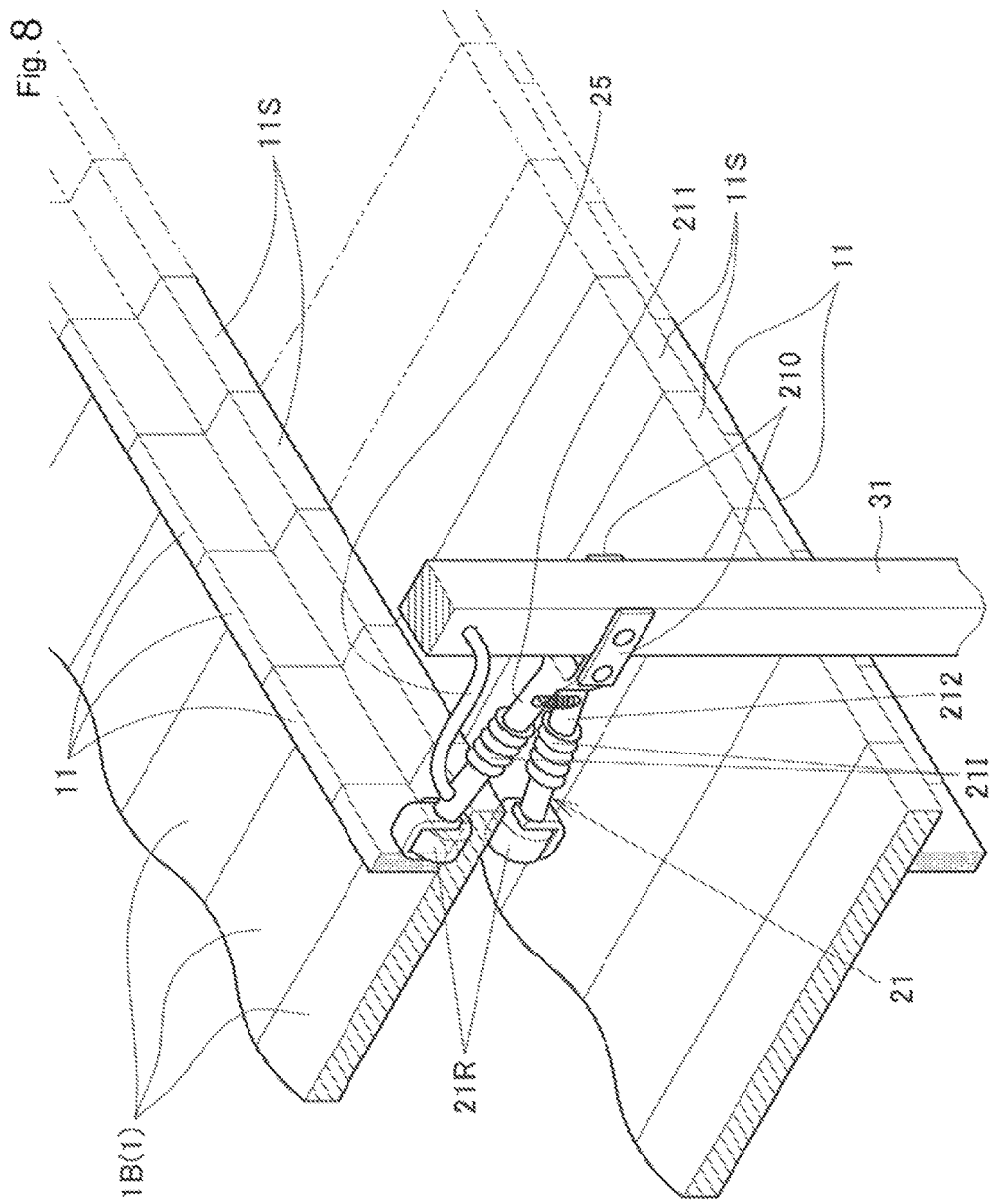
FIG. 8 is a partially enlarged perspective view showing the structure of the first electrode and the parts in the area around the first electrode of the preservation treatment apparatus according to the embodiment 1.

The second electrode 22 is basically constituted of: a proximal arm 220 which is connected to a side frame member 31 and extends inwardly; an upper arm 221 which is pivotally supported on an inner side of a holding arm 221 by way of a penetrating pin, and is rotatable in the upward direction; and a lower arm 222 which is pivotally supported on the inner side of the holding arm 221 below the upper arm 221 by way of the same penetrating pin, and is rotatable in the downward direction (FIG. 6). The upper arm 221 and the lower arm 222 are supported about pivotally supported portions with respect to the proximal arm 220 and, at the same time, are formed of conductors which extend in the obliquely upward direction and the obliquely downward direction respectively. A spring 11S extends between the upper arm and the lower arm, and automatically adjusts an open angle made between the upper arm and the lower arm within a predetermined range. A freely rotatable roller contact 22R is supported by way a frame on a distal end of the upper arm 221 and as distal end of the lower arm 222 respectively. The upper and lower roller contacts 22R are brought into contact with the belt piece 1B such that the upper and lower roller contacts 22R sandwich upper and lower portions of a one side end portion 11S of the belt piece 1B. The upper arm 211 and the lower arm 212 have an elongated rod shape, and an insulator 211 is interposed at center portions of the upper arm 211 and the lower arm 212 respectively. An electrode line 25 which is electrically connected with the voltage supply portion 20 is connected only to the upper arm 211.

(Enclosure Structure)

The enclosure structure of the embodiment 1 includes: a frame structure formed of assembled frame members surrounding side peripheries or upper and lower peripheries of the belt structure; and a lid plate 5 openably mounted on an upper assembled frame member 33 of the frame structure 3.

The third electrode 23 and the fourth electrode 24 of the embodiment 1 are arranged as a pair on left and right sides respectively at a plurality of arrangement portions along the belt advancing direction such that the third electrode 23 is brought into contact with one of an upper surface of one edge and a lower surface of one edge of the lid plate 5 and the fourth electrode 23 is brought into contact with the other of the upper surface of one edge and the lower surface of one edge of the lid plate 5

(Frame Structure 3)

To be more specific, the frame structure 3 is constituted of a plurality of columnar-shaped side assembled frame members 31; lower assembled frame members 32 which are fixed to lower ends of the side assembled frame members 31 and are connected to each other in an approximately horizontal manner; and the upper assembled frame members 33 which are fixed to upper ends of the side assembled frame members 31 and are connected to each other in an approximately horizontal manner. All assembled frame members are formed of rod-shaped frame members haying a rectangular cross section, and are formed into an integral frame.

The side frame members 31 of the frame structure 3 are provided in a raised manner at plural portions along the belt advancing direction in a spaced-apart manner.

The lower frame members 32 of the frame structure 3 are assembled into a quadrangular-shaped frame in the planar direction at a bottom portion of a tunnel like space.

The upper frame members 33 of the frame structure 3 are configured such that the respective frame members 33 extend in the approximately horizontal direction and are formed into an integral frame. The upper frame members 33 are assembled into a quadrangular-shaped frame in the planar direction above the belt structure, and an intermediate frame member 33C extends at an intermediate portion of the frame in the belt advancing direction and at an intermediate portion of the frame in the width direction.

(Lid Plates 5)

The lid plate 5 is formed of a set of left and right openable lids which are disposed on left and right sides in a separate manner. Two sets of lid plates 5 are arranged in a separate manner along the belt advancing direction. The respective lid plates 5 are fixed by hinges along side frame members of the upper frame members 33 which extend parallel to the belt advancing direction. When the lid plates 5 are mounted on the intermediate member 33C, the lid plates 5 are maintained in a closed state (S). On the other hand, when the lid plates 5 are raised on the side frame members, the lid plates 5 are maintained in an open state (O). To perform the maintenance or the adjustment of an electric energy field, as shown in FIG. 1, by bringing some sets of lid plate 5 into an open state (O) while bringing the remaining sets of lid plate 5 into a closed state (S), it is possible to change a time during which an effect of an electric energy field is given to an object O to be conveyed on the belt body.

The lid plate 5 is formed of a porous plate where a large number of holes 5H are formed in a plate frame. Holes may be formed by netting wires 5W as shown in FIG. 7a and FIG. 7b, or may be formed by applying blanking to a conductive metal plate as shown in FIG. 7c and FIG. 7d.

(Chamber 4 and Temperature Adjuster F)

The chamber 4 is formed of a tunnel-like space having an inlet and an exit on both front and rear ends thereof respectively, and surrounding the belt structure, the frame structure 3 and the lid plate 5. The temperature adjuster F is provided for cooling the object O on the belt structure during conveyance using the belt structure.

[Embodiment 2]

A preservation treatment apparatus of a second embodiment shown in FIG. 9 includes: a water tank 6 provided with a freezing mechanism which holds a freezing liquid 6S in a chamber 4; upper and lower sandwiching belts 1UB, 1LB which passes through the freezing liquid 6S in the water tank 6 in an immersed manner; and an ingot belt structure which is configured such that ingots 11 made of a plurality of metal blocks are connected to each other in a belt shape, and the ingots on an upper side are half-immersed in the freezing liquid 6S. A hollow lid 5 is fixed above the ingot belt, and a third electrode and a fourth electrode are connected to an upper portion of one end of the hollow lid 5 and a lower portion of the other end of the hollow lid 5 respectively. Further, a first electrode and a second electrode are connected to an upper portion of one end of the water tank and a lower portion of the other end of the water tank respectively. The hollow lid 5 is formed of a punching plate having a large number of ventilation holes 5H as shown in FIG. 7c or FIG. 7d, and metal-based conductive fibers are laminated to the hollow lid 5 such that the conductive fibers cover the whole lower surface of the hollow lid 5 including the ventilation holes 5H. Cold air from the breeze F1 which is the temperature adjuster F mounted along a ceiling part of the chamber 4 hits an upper portion of the hollow lid 5. Cold air from the breeze F1 which is the temperature adjuster F cools the inside of the chamber 4 and an object O1 above the ingot belt.

Due to the above-mentioned constitution, it is possible to provide a hybrid freezing machine which can perform both liquid freezing where an object O2 having liquid resistance is frozen by making the object O2 pass through a freezing liquid while conveying the object O2 and belt conveyance freezing where an object O1 having no liquid resistance is frozen by conveying the object O1 by an ingot belt.

[Embodiment 3]

The preservation treatment apparatus of the embodiment 3 shown in FIG. 10 includes the enclosure structure having a hermetically sealed box shape which also functions as a placing portion 1, wherein the enclosure structure is formed of: a storing box for storing an object O which is placed hermetically and at rest in the inside of the chamber 4 and is formed of the placing box 10; and a lid frame 50 which hermetically seals the storing box by covering an upper opening of the storing box. Metal-based conductive fibers S are laminated to an inner surface of the hermetically sealed box. In the preservation treatment apparatus of this embodiment, an object O placed in the inside of the hermetically sealed box is wrapped by metal-based conductive fibers S.

To be more specific, metal-based conducive fibers S are acquired by forming organic fibers into which copper sulfide which is a charging material is impregnated into a fabric or a non-fabric. Metal-based conducive fibers S are organic conductive fibers having surface resistance of 80 to 100 $\Omega/m^2$ and are formed using semiconductor fibers for small charging thus suppressing the surplus electrical conduction around an object while securing antibacterial property. Further, the fibers S are liable to be negatively charged and hence, by applying a negative DC voltage to one electrode out of a set of electrodes, it is possible to continuously hold some positive electrostatic property around an object O. In the hermetically sealed box, a conductive packing 1P is laminated to an upper portion of the placing box. A gap formed between the hermetically sealed box and the lid frame 50 when the hermetically sealed box is hermetically sealed is filled with the conductive packing 1P, and the lid frame and the placing box are electrically connected with each other. One set or two sets of first electrode, second electrode, third electrode and fourth electrode are connected to side walls shown in FIG. 10(a) to FIG. 10(d) at respective positions.

[Embodiment 4]

In a preservation treatment apparatus according to an embodiment 4 shown in FIG. 11, a plurality of shelf frames 30 each of which stores a large number of placing portions 1 which form shelf plates are stored in the inside of a movable chamber electric car 4C having electricity receiving arms 20A which are brought into contact with two overhead wires 23W, 24W stretched above the preservation treatment apparatus. The chamber 4 is the chamber electric car 4C which self-travels by receiving electricity along, the overhead wires 23W, 24W by means of wheels 4R mounted on a lower portion of the chamber 4. Power source supply portions 20α, 20β mounted on an upper portion of the electric car receive electricity from the overhead wires 23W, 24W respectively and perform the adjustment of an AC potential, AC/DC conversion and the adjustment of potential. The power source supply portions 20α, 20β are respectively electrically connected to two connectors 23C, 24C mounted on a side portion of the shelf frame through conductive lines 23L, 24L arranged on an inner wall of the chamber electric car. In the shelf frame 30, an electric wire covered with a silicon cover is connected along a side of the frame between the connector 23C and the third electrode 23 disposed at a corner on a deep side of an upper portion of one side portion of the flame. On the other hand, an electric wire covered with a silicon cover is connected along a side of the frame between the connector 24C and the fourth electrode 24 disposed at a corner on a front side of a lower portion of the other side portion of the frame. The placing plate 1 which is a shelf plate is a conductive plate and receives a potential from the shelf frame.

[Embodiment 5]

A preservation treatment apparatus according to an embodiment 5 shown in FIG. 12 and FIG. 13 adopts the suspending pulley structure of a self-traveling wheel 70R type where pulley wheels 70R which are mounted on one overhead wire W stretched in an upper portion of the preservation treatment apparatus are rotated by their own power. The pulley wheel includes an engaging hook 7F which engageably supports an object in a suspending manner, and the pulley wheels receive voltages of a negative DC potential and an AC potential from walls of both side portions by means of contact rollers 74R, 75R attached to projecting frames 71 projecting toward both sides of the engaging hook 7F in vertical symmetry. The chamber 4 is formed of a passage bent in an inverted U shape ranging from an entrance seat 4C disposed on a right side facing FIG. 12 to an exit seat 4C disposed on a left side facing FIG. 12. One overhead wire W is stretched in an upper portion of the preservation treatment apparatus along an advancing direction of the passage, and the suspending pulley structure of a self-traveling wheel 70R type suspended from the stretched overhead wire W conveys an object O. After the conveyance is performed, cooling or freezing of the object O is completed. A roller frame 4F is mounted on both side walls of the chamber respectively, and the roller frame 4F is stretched on the whole sides at vertical positions where the roller frame 4F is brought into contact with the contact rollers 74R, 75R, and the respective contact rollers advance along the roller frame 4F. However, insulators 74G, 75G having a circuler cross section are slidably provided on a right upper side and a left lower side facing the advancing direction in place of contact rollers, and electricity is received only by contact rollers 74R, 75R on a right lower side and a left upper side facing the advancing direction.

The present invention is not unduly limited to the above-mentioned embodiments, and the arrangement of the electrodes, the constitution, the forming mode and the arrangement of the enclosure structure may be suitably selected, the constitutional elements of the above-mentioned embodiments may be combined with each other, some of the constitutional elements of the above-mentioned embodiments may be omitted, or the constitutional elements of the above-mentioned embodiments may be partially used without departing from the gist of the present invention.

object O
placing portion 1
Placing box 10
one side portion 11S
conductive packing 1P
first electrode 21
the other side portion 12S
second electrode 22
third electrode 23
fourth electrode 24
voltage supply portion 20
frame structure 3
shelf frame 30
side portion frame 31
chamber 4
lid plate 5
lid frame 50
temperature adjuster F
belt piece 1B
belt roll R
conductive fibers S
fixing hook 7F

The invention claimed is:

1. A preservation treatment apparatus for treating an object containing oxide into a preservable state comprising:
   a placing portion having a conductive placing surface on which the object is placed or an engaging portion having a conductive engaging surface with which the object is engaged;
   a conductive enclosure structure configured to be formed continuously with an upper portion of the placing portion or configured to be arranged in the vicinity of the placing portion in a spaced-apart manner, and surrounding at least one of left and right sides, front and rear sides and upper and lower sides of the object as viewed from the object placed on the placing surface;
   one or more sets of electrodes, each set of electrodes being constituted of a DC electrode which is brought into contact with either one of the placing portion and the enclosure structure and an AC electrode which is brought into contact with the other one of the placing portion and the enclosure structure respectively;
   a voltage supply portion electrically connected with respective electrodes which constitute the set of electrodes, the voltage supply portion being configured to supply a negative DC voltage to one electrode of each set of electrodes and to supply an AC voltage to the other electrode, wherein one electrode and the other electrode which constitute the set of electrodes are respectively arranged at symmetrical positions in a spaced-apart manner along extensions of a diagonal line direction on one plane expanding outwardly as viewed from the Object placed on the placing portion or engaged with the engaging portion, in a state where at least any one of the left and right sides, front and rear sides and upper side of the object as viewed from the object are surrounded by a conductor, the voltage supply portion simultaneously applies a negative DC voltage and an AC voltage to one and the other of the electrodes which are arranged in a spaced-apart manner along both directions along a diagonal line direction where the object is arranged close to the center on one plane expanding outwardly of either one of the placing portion and the enclosure structure which surround the periphery of the object respectively, and wherein the voltage supply portion simultaneously applies a negative DC voltage equal to the voltage applied to a first electrode to either one of a third electrode and a fourth electrode and an AC voltage equal to the voltage applied to a second electrode to the other one of the third electrode and the fourth electrode, the enclosure structure includes a lid plate arranged above at least a placing plate and expanding in the planar direction, and an upper position of the lid plate close to one side portion of the lid plate is brought into contact with the third electrode and a lower position of the lid plate close to the other side portion of the lid plate is brought into contact with the fourth electrode respectively, and the lid plate to which electricity is applied by the voltage supply portion forms an electric energy held above the object placed on the placing surface.

2. The preservation treatment apparatus according to claim 1, wherein conductive fibers are disposed in a fixed marlner above the placing surface of the placing portion, on an upper portion of the enclosure structure or on both side portions and front and rear portions of the enclosure structure so as to surround at least one of upper and lower sides or four peripheral sides of the object placed on the placing portion, and a negative DC voltage and an AC voltage are simultaneously applied to the conductive fibers by the voltage supply portion in a state where the conductive fibers surround the object on the placing portion.

3. The preservation treatment apparatus according to claim 2, wherein the placing portion is formed of a belt structure which includes: a belt body constituted of a plurality of belt pieces connected together in a belt shape; and a plurality of belt rolls for controlling belt rotation by being brought into contact with respective inner surfaces of a front side and a rear side of the belt body in an advancing direction of the belt body, the first electrode and the second electrode are arranged as a pair on left and right sides respectively at a plurality of arrangement portions of the belt structure along the belt advancing direction such that the first electrode is brought into contact with one of an upper surface of one edge and a lower surface of one edge of the belt pieces on an upper side of the belt body and the second electrode is brought into contact with the other of the upper surface of one edge and the lower surface of one edge of the belt pieces on the upper side of the belt body, the enclosure structure includes: a frame structure formed of assembled frame members surrounding side peripheries or upper and lower peripheries of the belt structure; and the lid plate openably mounted on an upper assembled frame member of the frame structure, the third electrode and the fourth electrode are arranged as a pair on left and right sides respectively at a plurality of arrangement portions along the belt advancing direction, a chamber is formed of a tunnel like space having an inlet and an exit on both front and rear ends thereof respectively and surrounding the belt structure, the frame structure and the lid plate, and a temperature adjuster is configured to cool the object on the belt structure during conveyance using the belt structure.

4. The preservation treatment apparatus according to claim 2, wherein the conductive fibers are laminated to the lid plate.

* * * * *